(12) United States Patent
Gregory

(10) Patent No.: US 11,994,867 B2
(45) Date of Patent: May 28, 2024

(54) SYNCING OPERATIONAL DATA FOR HEAVY EQUIPMENT

(71) Applicant: Paravit, LLC, Dallas, TX (US)

(72) Inventor: Kevin Gregory, Dallas, TX (US)

(73) Assignee: Paravit, LLC

( * ) Notice: Subject to any disclaimer, the term of this patent is extended or adjusted under 35 U.S.C. 154(b) by 208 days.

(21) Appl. No.: 17/220,826

(22) Filed: Apr. 1, 2021

(65) Prior Publication Data

US 2021/0311482 A1 Oct. 7, 2021

Related U.S. Application Data

(60) Provisional application No. 63/004,402, filed on Apr. 2, 2020.

(51) Int. Cl.
| | | |
|---|---|---|
| *G05D 1/02* | (2020.01) |
| *A01G 23/08* | (2006.01) |
| *A01G 23/099* | (2006.01) |
| *G05D 1/00* | (2006.01) |

(52) U.S. Cl.
CPC .......... *G05D 1/0214* (2013.01); *A01G 23/08* (2013.01); *A01G 23/099* (2013.01); *G05D 1/0022* (2013.01); *G05D 1/0257* (2013.01); *G05D 1/0274* (2013.01); *G05D 1/0278* (2013.01)

(58) Field of Classification Search
CPC .. G05D 1/0214; G05D 1/0022; G05D 1/0257; G05D 1/0274; G05D 1/0278; G05D 2201/0201; A01G 23/08; A01G 23/099
See application file for complete search history.

(56) References Cited

U.S. PATENT DOCUMENTS

| | | | |
|---|---|---|---|
| 2,959,201 | A | 11/1960 | LeTourneau |
| 3,027,141 | A | 3/1962 | Ellis |
| 3,528,467 | A | 9/1970 | Watsabaugh |
| 2009/0127525 | A1 | 5/2009 | Teurlay et al. |
| 2009/0255228 | A1 | 10/2009 | Sprinkman |
| 2012/0257042 | A1* | 10/2012 | McKaigue ........... G01N 21/954 |
| | | | 348/E7.087 |
| 2012/0271489 | A1 | 10/2012 | Roberts et al. |
| 2017/0315561 | A1* | 11/2017 | Kadono ................ B60W 40/12 |

(Continued)

FOREIGN PATENT DOCUMENTS

CA 3074369 A1 9/2020

OTHER PUBLICATIONS

Stene, Eric A., Bureau of Reclamation, Hungry Horse Project, 1995 (Year: 1995).*

(Continued)

*Primary Examiner* — Jess Whittington
*Assistant Examiner* — Terry C Buse
(74) *Attorney, Agent, or Firm* — TechLaw Ventures, PLLC; Terrence J. Edwards

(57) ABSTRACT

Communications between heavy equipment machines during tree felling operations. A method includes identifying a tree felling area to be cut in a tree felling operation and determining instructions for executing the tree felling operation with two or more heavy equipment machinery. The method includes receiving first sensor data from a first heavy equipment during execution of the tree felling operation and providing the first sensor data to a second heavy equipment during execution of the tree felling operation.

20 Claims, 14 Drawing Sheets

(56) References Cited

U.S. PATENT DOCUMENTS

2018/0364366 A1* 12/2018 Cvijetic ............... H04W 4/027
2020/0146226 A1*  5/2020 Hamilton ........... G06Q 10/0631
2020/0159220 A1   5/2020 Hurd et al.
2021/0311470 A1  10/2021 Gregory
2022/0185290 A1*  6/2022 Sanfridson ........... G05D 1/0293
2022/0381007 A1* 12/2022 Hodel .................... E02F 9/265

OTHER PUBLICATIONS

Popular Science, Bowling Down, Aug. 1950, pp. 90-94 (Year: 1950).*
Lohnes, Brian, "Best of BangShift: Bulldozers and Steel Balls—BangShift Greatness Circa 1950," Dec. 25, 2015, BangShift news (Year: 2015).

\* cited by examiner

SYNCING OPERATIONAL DATA FOR HEAVY EQUIPMENT

CROSS-REFERENCE TO RELATED APPLICATIONS

This application claims the benefit of U.S. Provisional Patent Application No. 63/004,402 filed Apr. 2, 2020, titled "SYNCING OPERATIONAL DATA FOR HEAVY EQUIPMENT," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

The present disclosure relates to software and hardware solutions for heavy equipment and relates particularly to syncing and saving operational data for heavy equipment.

BACKGROUND

Heavy equipment and heavy machinery can be exceptionally dangerous to operate. Heavy equipment by its nature is large, heavy, and capable of causing injury to people or animals and causing damage to property. One implementation where heavy equipment is particularly dangerous is tree felling operations. Tree felling operations may be executed to cut down and remove trees and other plant life to promote the wellbeing of an ecosystem, to curtail the spread of wildfires, and for other reasons. Because tree felling operations include cutting down and hauling away mature trees that can be heavy, large, and dangerous to heavy equipment operators, tree felling is inherently a dangerous task. Therefore, there is a desire to develop systems, methods, and devices that increase the safety of heavy equipment operations and reduce the likelihood that accidents will occur when operating heavy equipment.

In light of the foregoing, disclosed herein are systems, methods, and devices for improved communications between heavy equipment and other systems.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
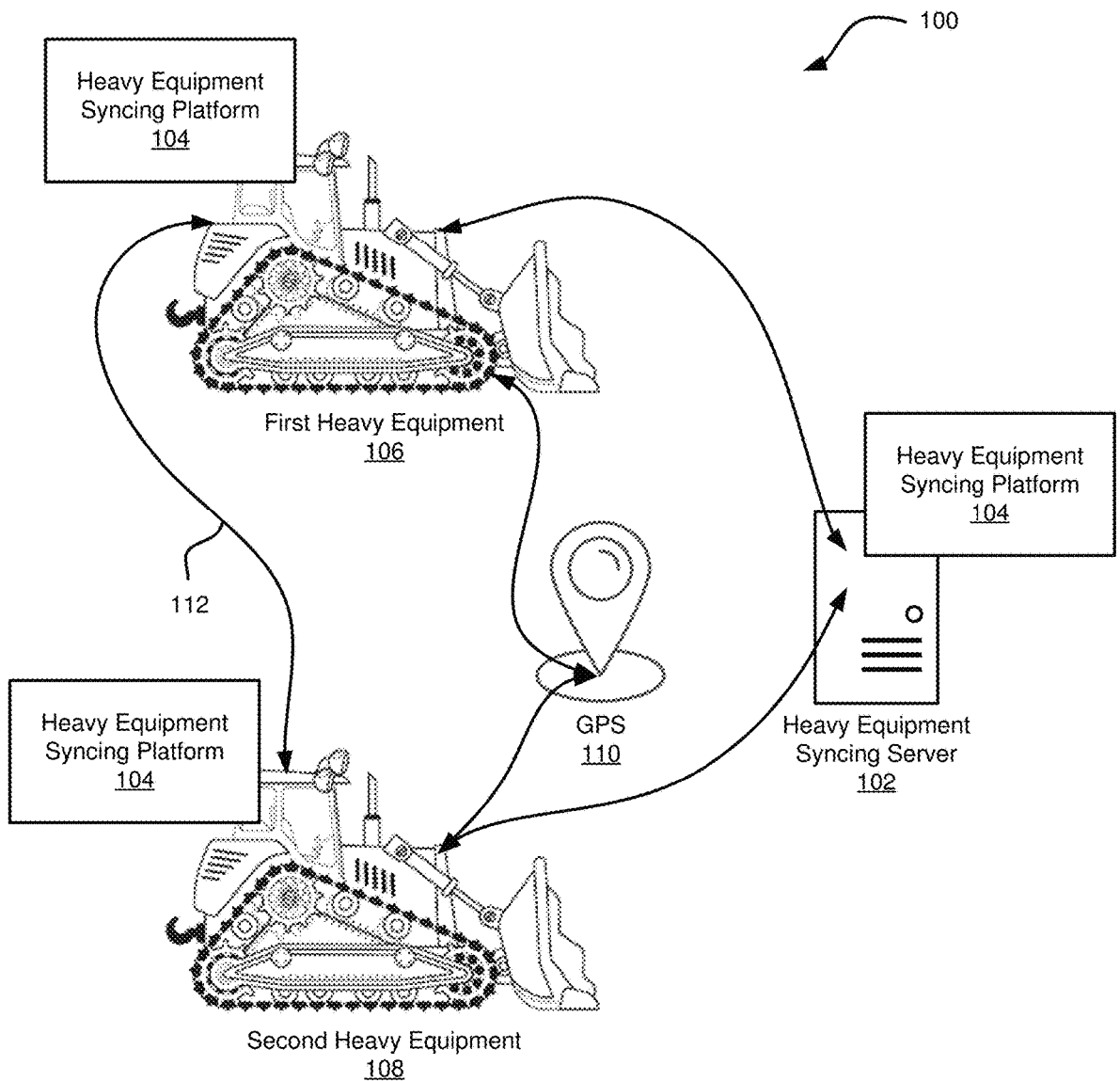
FIG. 1 is a schematic diagram of a system for communications between heavy equipment and for communications to and from heavy equipment from outside systems and equipment.

Disclosed herein are systems, methods, and devices for syncing operational data for heavy equipment. The disclosures presented herein may be particularly useful for syncing sensor data between two or more dozers used for cutting down trees in an effort to prevent the spread of forest fires.

One means for preventing future forest fires and curtailing the spread of an active fire is the method of tree felling or concentrated logging. Tree felling is a forestry and logging practice in which most or all trees in an area are uniformly cut down. Tree felling is used by foresters to create certain types of forest ecosystems and to promote select species that require an abundance of sunlight or grow in large even-age stands. Tree felling can be used to curtail the spread of a forest fire by creating a gap in the tree growth, and thereby preventing the fire from spreading tree-to-tree.

One method of tree felling includes the use of heavy equipment configured to cut down and uproot trees in its path. This process of tree felling can be exceptionally dangerous for the heavy equipment operator. Trees can repeatedly fall on top of the heavy equipment and endanger the life and safety of the operator. Traditional methods of tree felling present numerous dangers for the tree felling operators, and therefore, it is desirable to develop improved, safer methods of tree felling.

In light of the foregoing, disclosed herein are systems, methods, and devices for improved real-time communications between two or more heavy equipment machines. An embodiment of the disclosure includes hardware and software functionality for heavy equipment to collect sensor data, assess the sensor data, store the sensor data, and transmit the sensor data to another heavy equipment and/or a server. In an exemplary use-case, the disclosures herein provide a means to track the precise location of a first tree felling track and then use the information about the first tree felling track to then cut a second tree felling track that runs parallel to the first tree felling track. Additionally, the data about each of the first tree felling track and the second tree felling track can enable two heavy equipment machines to run parallel to one another without directly seeing one another in real-time.

Before the methods, systems, and devices for heavy equipment communication systems are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

A detailed description of systems, methods, and devices consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for clarity, certain technical material that is known in the related art has not been described in detail to avoid unnecessarily obscuring the disclosure.

Referring now to the figures, FIG. 1 is a schematic diagram of a system 100 for inter-machine communications. In the exemplary embodiment illustrated in FIG. 1, the system enables communications between a first heavy equipment 106 and a second heavy equipment 108. It should be appreciated that the system 100 may provide for communication between a single heavy equipment machine and a server, or between three or more heavy equipment machines. The embodiment illustrated in FIG. 1 should not be seen as limiting.

The system provides for communication 112 between the first heavy equipment 106 and the second heavy equipment 108, and additionally provides for communications between heavy equipment and a Global Positioning System (GPS) 110 and a heavy equipment syncing server 102. The heavy equipment server 102 may provide processing operations for a heavy equipment syncing platform 104. The heavy equipment syncing platform 104 may be accessible to one or more users by way of a user interface.

In some implementations, it is important to provide for real-time communications between heavy machinery. Specifically, in tree felling operations, it can be important to provide for real-time communications between two or more dozers. During a tree felling operation, the dozer operators, and the dozer sensor systems, are unable to see one another because there are too many trees and other obstacles between the dozers. In such an operation, it is important to enable real-time communications between the two dozers for the safety of the dozer operators. In an embodiment, each of the first heavy equipment 106 and the second heavy equipment 108 is a dozer configured for cutting trees in a tree felling operation. In such an embodiment, each of the first heavy equipment 106 and the second heavy equipment 108 may be outfitted with a specialized blade for cutting trees and other objects. It should be appreciated that the disclosures herein are not limited to dozers or tree felling operations, and the first and second heavy equipment 106, 108 may represent any heavy equipment or heavy machinery.

The heavy equipment 106, 108 may communicate with a GPS 110. In an embodiment, there is a GPS installed in each of the heavy equipment 106, 108, and the installed GPS is capable of communicating with a satellite (or other location) system for determining the precise global coordinates of the heavy equipment 106, 108. The GPS 110 may be a high-precision positioning system to determine the precise global coordinates of the heavy equipment 106, 108 at any time. The heavy equipment 106, 108 receives GPS satellite information used with real-time kinematic (RTK) corrections and/or differential GPS (DGPS) corrections. The GPS satellite information with RTK corrections provides for centimeter-level global coordinate accuracy. The GPS satellite information with DGPS corrections provides for sub-meter accuracy. The RTK-corrected GPS satellite information is communicated to the heavy equipment 106, 108 to allow for centimeter-level positional accuracy.

The global coordinates of the heavy equipment 106, 108 are continually retrieved and timestamped as the heavy equipment 106, 108 is moving or performing an operation. A log of global coordinates, with the accompanying timestamps, may be stored locally on the heavy equipment 106, 108, may be communicated 112 between heavy equipment 106, 108, and/or may be uploaded to the heavy equipment syncing server 102. This timestamped log of global coordinates can be assessed to calculate a precise path of the heavy equipment 106, 108 when the heavy equipment 106, 108 was moving or performing an operation. The timestamped log of global coordinates indicates a precise tree felling path that was completed or is currently in-process by the heavy equipment 106, 108.

The heavy equipment 106, 108 may be in communication with a heavy equipment syncing server 102. There is two-way communication between the heavy equipment 106, 108 and the heavy equipment syncing server 102. These communications may be carried out by way of a communications satellite that relays amplifies telecommunications signals between the heavy equipment 106, 108 and the heavy equipment syncing server 102. The heavy equipment 106, 108 communicates with Iridium satellites to upload operations data to the heavy equipment syncing server 102 for remote operations analytics. This may be particularly beneficial when the heavy equipment 106, 108 is located in a remote location without cellular data service. In the case of remote locations with access to cellular data service, the heavy equipment 106, 108 may communicate with the heavy equipment syncing server 102 by way of cellular data service, such as long-term evolution (LTE) communications, otherwise the heavy equipment 106, 108 may use Iridium satellites to communicate. The LTE communications may be 2G, 3G, 4G, 5G, and so forth communications. It should be appreciated that the communications between the heavy equipment 106, 108 and the heavy equipment syncing server 102 may be carried about by any suitable communications technology.

The heavy equipment syncing server 102 provides processing operations for a heavy equipment syncing platform 104. The heavy equipment syncing platform 104 may be provided to a user in a user interface that is accessible on a personal computing device such as a personal computer, a laptop, a mobile phone, and so forth. The heavy equipment syncing platform 104 may be presented in an application that provides downloadable software for a personal computing device and/or on the Internet by way of a web browser. The heavy equipment syncing platform 104 may be available as a Software as a Solution (SaaS) solution for managing the heavy equipment 106, 108 operations, managing data captured by sensors on the heavy equipment 106, 108, managing projects, and so forth.

The heavy equipment 106, 108 communicate 112 directly with one another. In an embodiment, these communications are accomplished by Bluetooth technology. Bluetooth is a wireless technology standard used for exchanging data between fixed and/or mobile devices over short distances using short-wavelength ultra-high frequency (UHF) radio waves. In a particular embodiment, the Bluetooth communications are carried out in the radio bands from 2.400 to 2.485 GHz. In an embodiment, the communications 112 between the heavy equipment 106, 108 are carried about via long-range radio signals. In a particular embodiment, the long-range radio signals are carried out in radio frequency bands from 775 MHz to 945 MHz. In a more particular embodiment, the long-range radio signals are carried out in radio frequency bands of 863-870 MHz (for Europe), 902-928 MHz (for Australia and North America), 779-787 MHz (for China), and 900-930 MHz (for other Asian countries and areas). In an even more particular embodiment, the long-range radio signals are carried out in a radio frequency of 868 MHz (for Europe), 915 MHz (for Australia and North America), 780 MHz (for China), and 923 MHz (for other Asian countries and areas). These communications 112 provide vital equipment telemetry between the first heavy equipment 106 and the second heavy equipment 108. In an implementation, the communication 112 includes Bluetooth® Low Energy In Long Range Mode communication, which may also be known as Coded PHY and operates at the 2.4 Ghz band. The communication 112 may include loading data on to a data storage device such as a Universal Serial Bus (USB) device and transfer the data from one heavy equipment 106, 108 to the other heavy equipment by copying the data on the storage device. The communication 112 transmits cut information, pathway information, cable load and length information, and other information from one heavy equipment 106, 108 to one or more other heavy equipment devices 106, 108.

In an exemplary implementation, the first heavy equipment 106 carries out a tree felling operation to cut down trees in a first tree felling track the width of the first heavy equipment 106 blade. During the tree felling operation, the first heavy equipment 106 captures sensor data to determine, for example, the precise coordinates of the first heavy equipment 106 at all times during the tree felling operation, the accelerometer data, gyro meter data, and magnetometer data captured by the first heavy equipment 106 during the tree felling operation, and so forth. This information may be analyzed to calculate a precise path taken by the first heavy equipment 106 and thereby determine the precise location, width, elevation change, and so forth of the first tree felling track that was cut by the first heavy equipment 106. This information may be communicated 112 to the second heavy equipment 108 such that the second heavy equipment 108 can then cut a second tree felling track that is exactly or nearly parallel to the first tree felling track at all time. The first tree felling track and the second tree felling track may be located a set difference apart from one another at all times, for example 250 feet apart from one another, and the two tracks may be exactly parallel. The sensor data captured by the first heavy equipment 106 is communicated 112 to the second heavy equipment 108 to make it possible for the second heavy equipment 108 to cut the second tree felling track exactly parallel to the first tree felling track. Without this communication 112, the two tracks would not be exactly parallel and would likely deviate from one another. It is important for the two tracks to be parallel to ensure the safety of the operators in future tree felling operations as well as maximum efficiency and proper execution of the felling operations themselves, as detailed further below.

Figure 2:
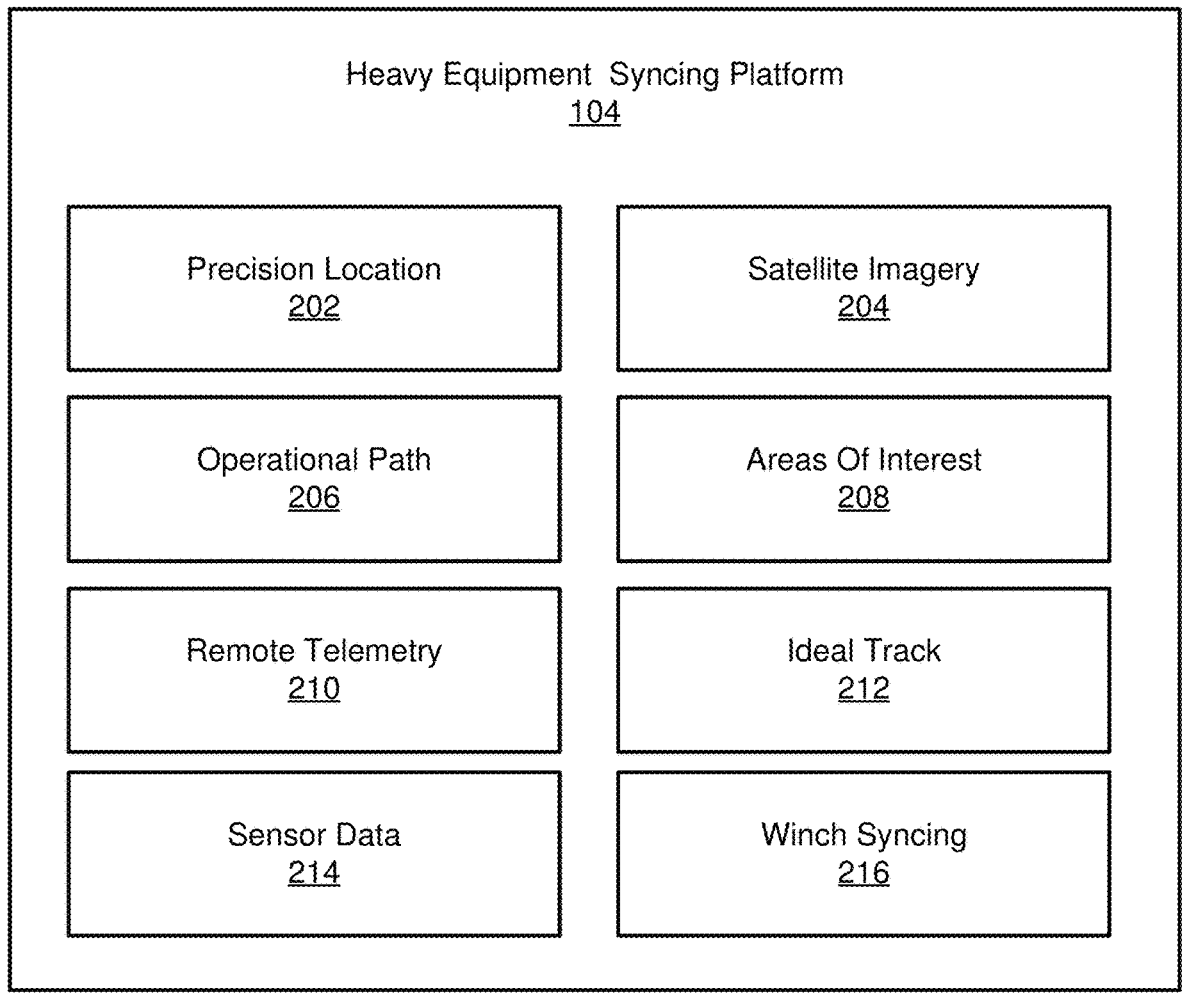
FIG. 2 is a block diagram illustrating exemplary component of a heavy equipment syncing platform.

FIG. 2 is a schematic block diagram illustrating exemplary features and functionalities of the heavy equipment syncing platform 104. Some exemplary features provided by the heavy equipment syncing platform 104 includes, for example: precision location 202, satellite imagery 204, operational path 206, areas of interest 208, remote telemetry 210, ideal track 212, sensor data 214, and winch syncing 216.

The precision location 202 component receives GPS data to determine the current price location of heavy equipment 106, 108 and compares this against the desired location of the heavy equipment 106, 108. The precision location 202 determines in real-time whether heavy equipment 106, 108 is on-course to properly execute a desired tree felling operation.

The satellite imagery 204 component receives satellite imagery from the heavy equipment syncing server 102 along with corresponding geographical coordinate information for the satellite imagery. The satellite imagery 204 component determines where heavy equipment 106, 108 is located on a satellite image based on the current geographical location of the heavy equipment 106, 108. The satellite imagery 204 component overlays a graphic of heavy equipment 106, 108 on a satellite image of a region to indicate whether the heavy equipment 106, 108 is currently located relative to the satellite image.

The operation path 206 determines a desired operational path for the heavy equipment 106, 108. The operation path 206 component may additionally generate messages for the heavy equipment 106, 108 indicating whether the heavy equipment 106, 108 is currently executing the desired operational path correctly and/or whether the heavy equipment 106, 108 should make an adjustment or change direction to get back on the correct path for executing the desired tree felling operation.

The operation path 206 component generates an operational path for executing a desired tree felling operation. The desired tree felling operation may indicate an area or region, along with geographical coordinates, where a tree felling operation should be performed. The operation path 206 component may then calculate where heavy equipment 106, 108 should begin to execute the tree felling operation, what speed the heavy equipment 106, 108 should travel, what turns or changes in direction the heavy equipment 106, 108 should execute, how far apart the tree felling tracks should be located, and so forth.

The heavy equipment syncing server 102 receives user input indicating a desired tree felling operation, including the desired geographical coordinates of the tree felling operation and the desired area of the tree felling operation. The operation path 206 component includes a neural network or is in communication with a neural network that is trained to identify locations where a tree felling operation should be performed to curtail the spread of forest fires.

The areas of interest 208 component determines which areas within a region should be avoided, which areas should be cut, which areas are dangerous, and so forth. The areas of interest 208 component receives information from a database indicating regions that are known to be dangerous or off-limits. The areas of interest 208 component communicates with a database to determine areas that are public land, private land, wildlife sanctuaries, and so forth to determine whether land is off-limits and should not be traversed by heavy equipment 106, 108.

The remote telemetry 210 component generates communications for other devices or components. The remote telemetry 210 component is onboard a heavy equipment 106, 108 and is configured to generate messages, data communications, and files to be transmitted to another heavy equipment 106, 108. The remote telemetry 210 component generates a tree felling track file comprising information, including geographical coordinates and other sensor data, for a tree felling track that has been cut by heavy equipment 106, 108. This file may be transmitted to another heavy equipment 106, 108 and/or the heavy equipment syncing server 102. The remote telemetry 210 component may additionally manage communications with other systems such as the GPS, satellites, and/or the heavy equipment syncing server 102.

The ideal track 212 component determines the ideal location of a tree felling track based on a desired tree felling operation area. The ideal track 212 component may determine the necessary steps to be performed by heavy equipment 106, 108 to execute the desired tree felling operation.

The sensor data 214 component receives sensor data in real-time from sensors mounted on heavy equipment 106, 108 and/or in communication with heavy equipment 106, 108. The sensor data 214 receives real-time geographical location data from GPS satellite information with RTK corrections for centimeter-level positional accuracy. The sensor data 214 receives real-time sensor data from one or more of an accelerometer, a gyro meter, a magnetometer, and a winch monitor of the heavy equipment 106, 108. The sensor data 214 component merges one or more forms of data to generate merged data that can be analyzed to determine whether heavy equipment 106, 108 is on-course to properly execute a tree felling operation.

Figure 10:
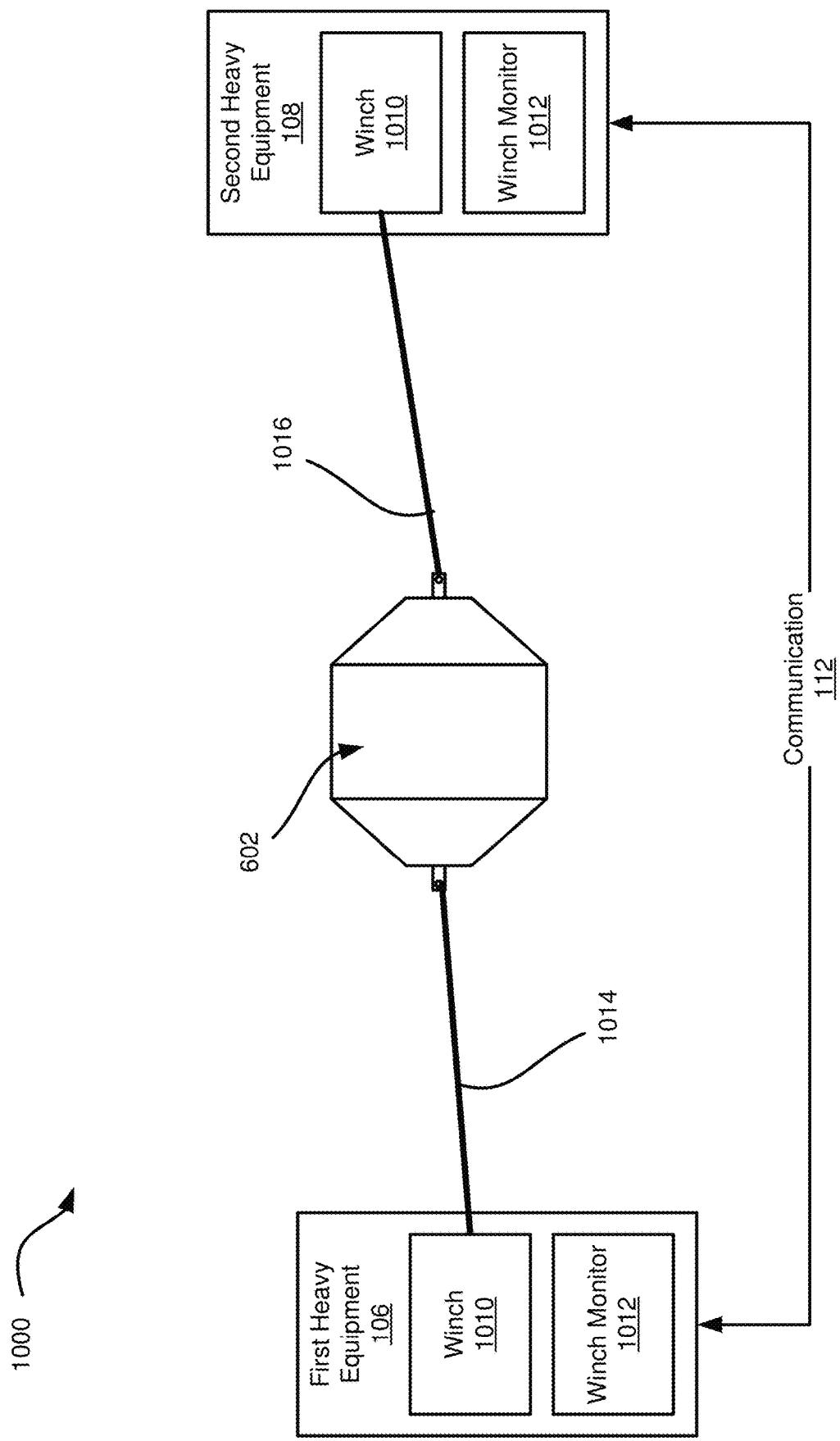
FIG. 10 is a schematic diagram of a fulcrum roller connected to a winch of a first heavy equipment and a winch of a second heavy equipment, and associated winch monitors for measuring a load and/or extended length of a cable attached to the respective winches.

The winch syncing 216 component receives real-time sensor data from a winch monitor (see winch monitor 1012 first illustrated in FIG. 10). The winch monitor measures how much cable has been released from a winch attached to the heavy equipment 106, 108. The winch syncing 216 component may additionally receive real-time sensor data from a winch monitor attached to a different heavy equipment 106, 108. When two or more heavy equipment 106, 108 are operating in tandem and are attached to one another by way of cable released from their respective winches, then the winch syncing 216 may determine whether the two or more heavy equipment 106, 108 have released the same length of cable. Additionally, the winch syncing 216 component may generate messages for the heavy equipment 106, 108 indicating that more cable should be released, or cable should be pulled back in such that the two or more heavy equipment 106, 108 have released the same amount of cable.

In some implementations, it is desirable that the two or more heavy equipment 106, 108 release different lengths of cable. For example, it may be desirable that 40% of the total length of cable is released from a first winch attached to the first heavy equipment 106 and 60% of the total length of cable is released from a second winch attached to the second heavy equipment 108. In such an embodiment, the winch syncing 216 component may track the length of cable that has been released by each of the two heavy equipment 106, 108 to ensure that this ratio is met throughout execution of the tree felling operation.

The winch syncing 216 component includes hardware attached to the winch or is in electrical communication with the winch to automatically execute turning the winch. For example, the winch syncing 216 component may determine that the winch should pull in additional cable, and the winch syncing 216 component may then cause the winch to automatically pull in the correct amount of additional cable without human intervention.

The heavy equipment syncing platform 104 is supported by hardware including processing resources, storage resources, sensors, communion antennas, and communication systems. The hardware includes specific hardware functionality required to implement the process of syncing the movements and parameters of two or more heavy equipment machines. The hardware allows the heavy equipment syncing software to function independent of a display unit and allow future integration with a Bluetooth-enabled device such as a personal computing device or mobile phone device to be used as the display component. The hardware includes supporting circuitry for receiving data from multiple sensors. The hardware may include one or more of an ultra-high precision GPS unit, a long-range radio unit, a Bluetooth-capable microcontroller, an accelerometer, a gyro meter, and a magnetometer. When functioning as the integrated display solution, the hardware may interface with a Raspberry Pi single board computer to run the heavy equipment syncing software.

Figure 3:
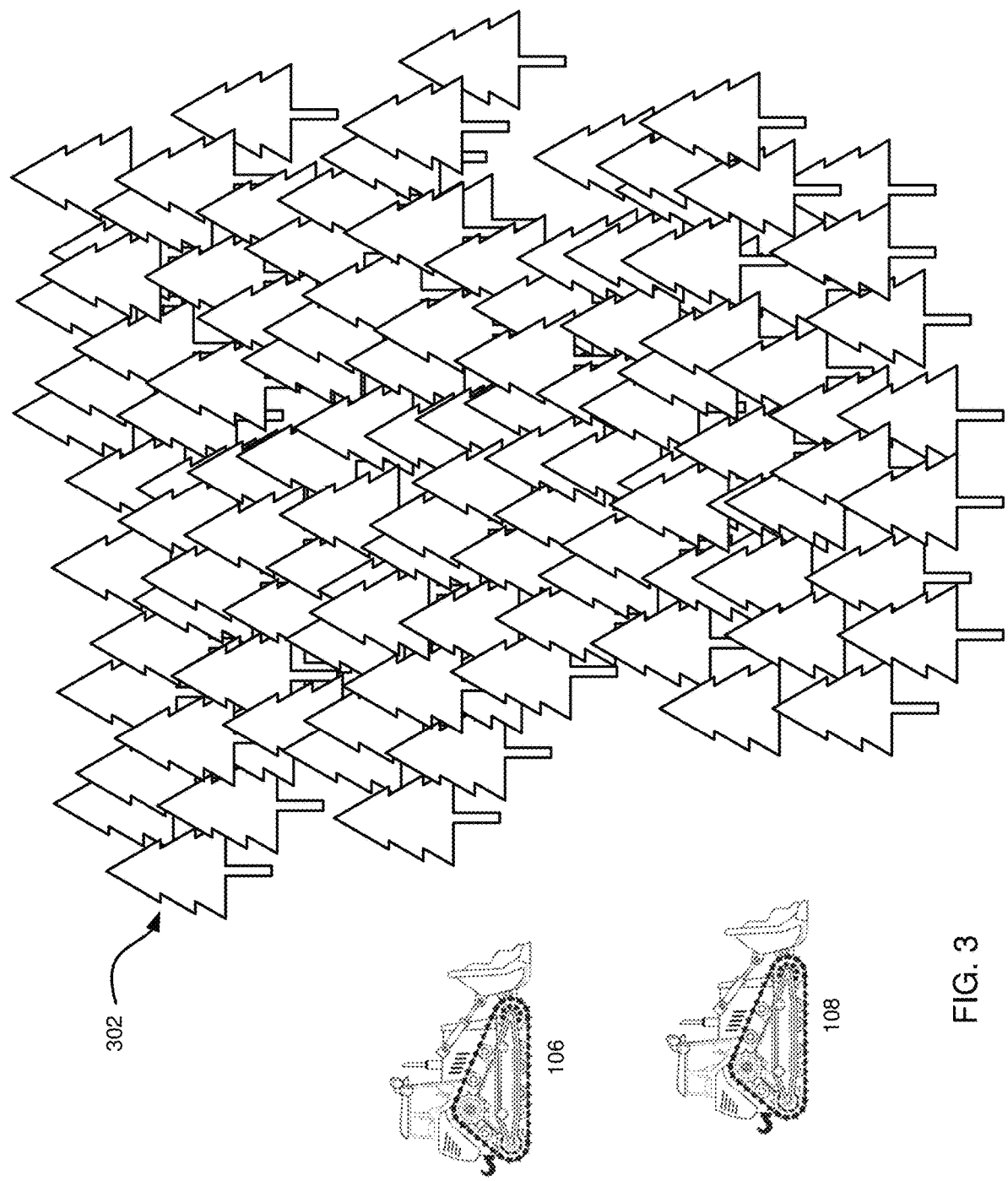
FIG. 3 illustrates an exemplary setup for a tree felling operation.
Figure 4:
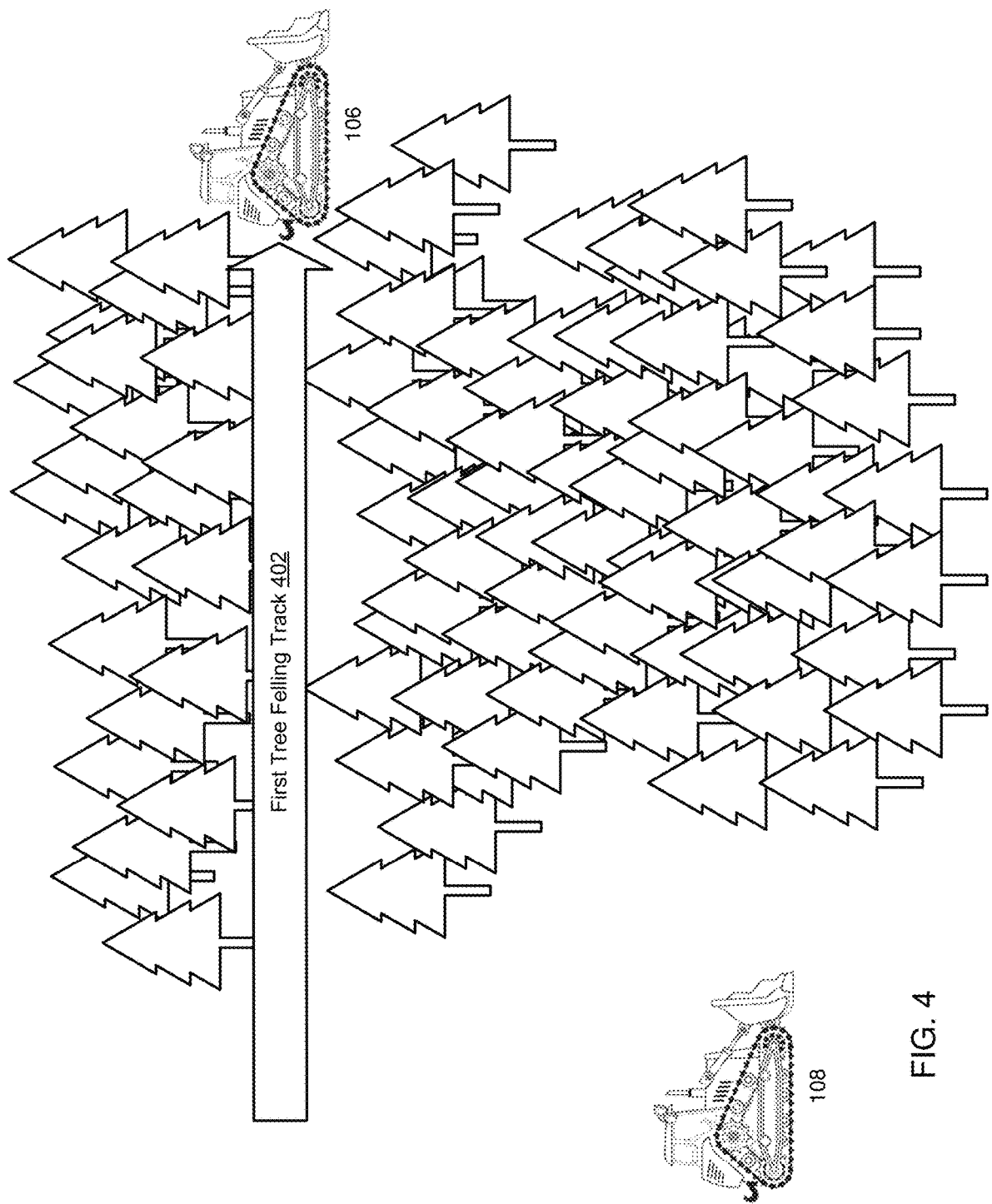
FIG. 4 illustrates execution of a first phase of an exemplary tree felling operation.
Figure 5:
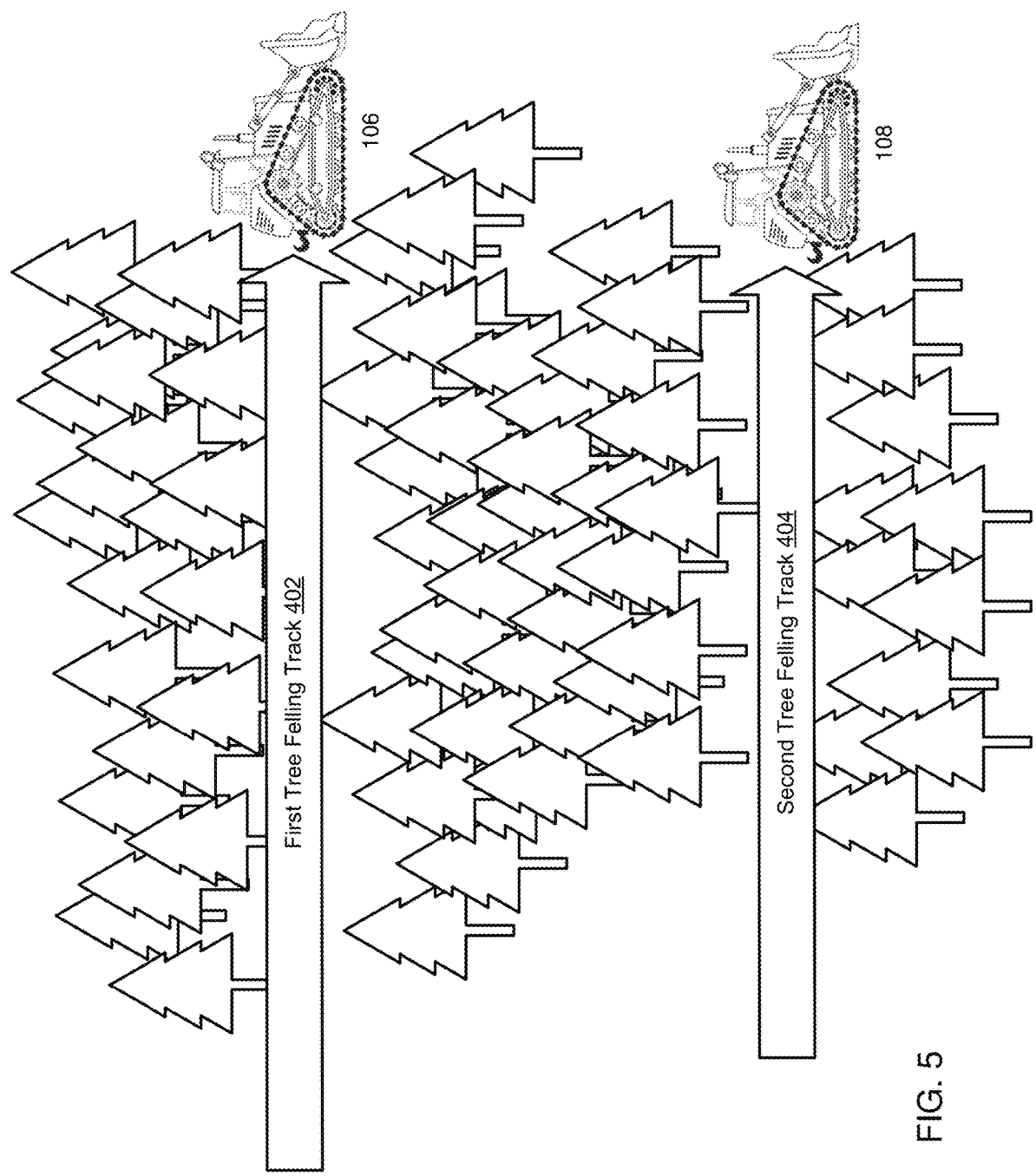
FIG. 5 illustrates execution of a second phase of an exemplary tree felling operation.
Figure 6:
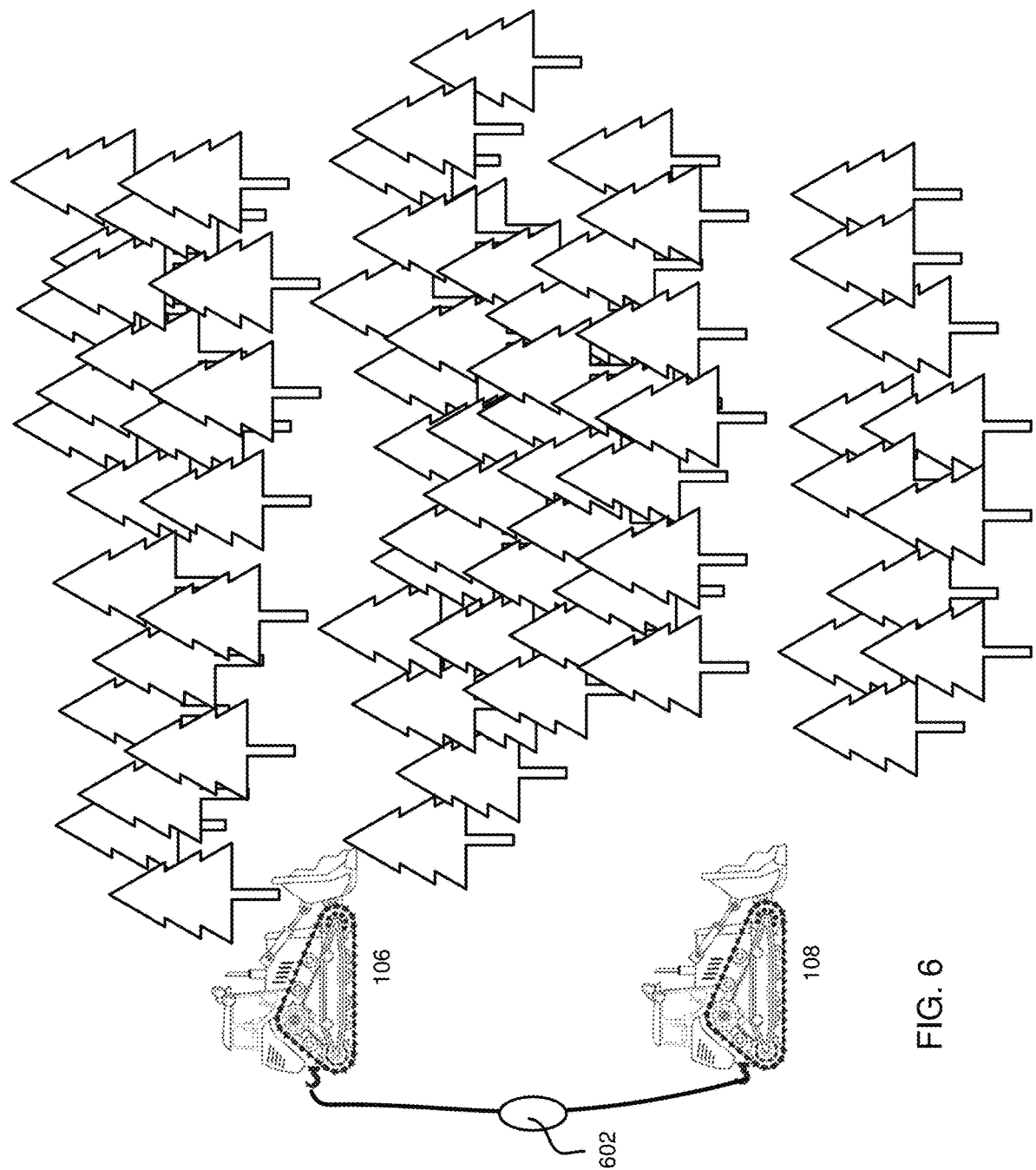
FIG. 6 illustrates execution of a third phase of an exemplary tree felling operation.
Figure 7:
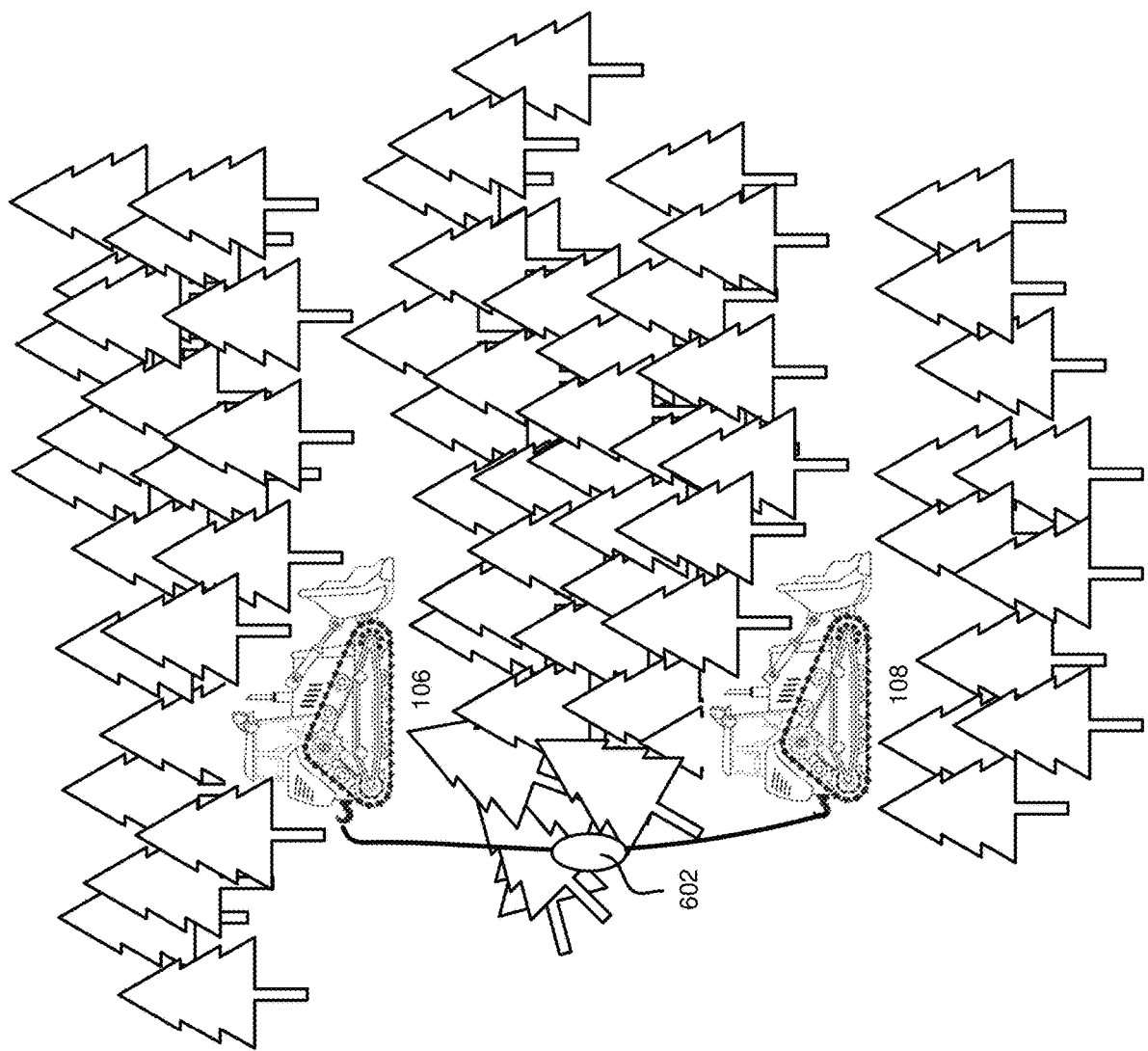
FIG. 7 illustrates execution of a third phase of an exemplary tree felling operation.
Figure 8:
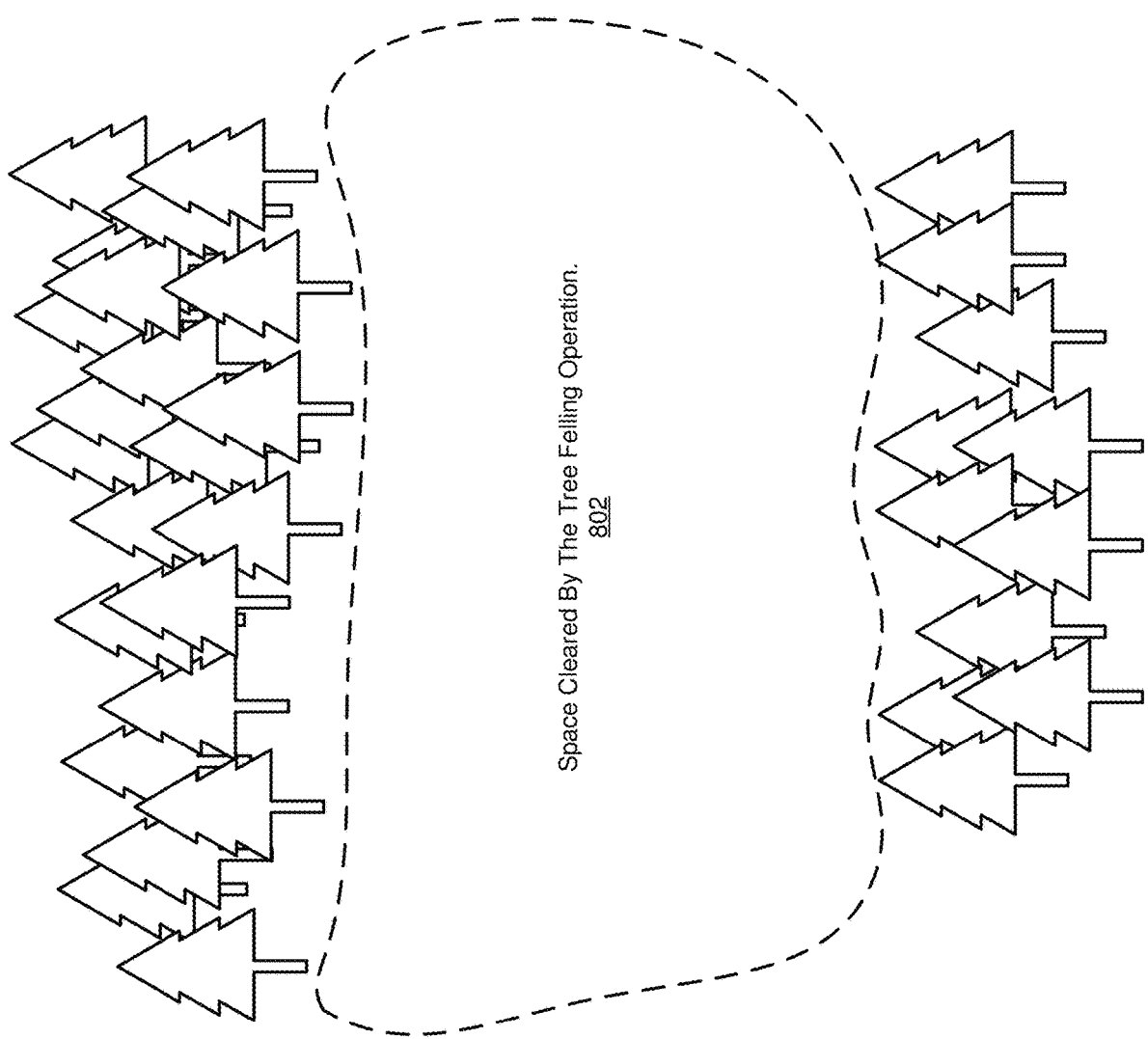
FIG. 8 illustrates the space cleared by a successful tree felling operation.

FIGS. 3-8 illustrate exemplary implementations and use-cases of the disclosures presented herein. FIG. 3 illustrates two heavy equipment machines in preparation to perform a tree felling operation of a tree grouping 302. FIG. 4 illustrates a first phase of an exemplary tree felling operation. FIG. 5 illustrates a second phase of an exemplary tree felling operation. FIGS. 6-7 illustrate a third phase of an exemplary tree felling operation. FIG. 8 illustrates an alternative implementation of a tree felling operation.

FIG. 3 illustrates the first heavy equipment 106 and the second heavy equipment 108 stationed in preparation to perform a tree felling operation on the tree grouping 302. In some instances, it is beneficial to perform tree felling operations in preparation for a potential forest fire or to curtail the progression of an active forest fire. This type of tree felling operation is typically performed to create a gap within the tree grouping 302 such that the fire cannot easily hop from tree to tree and burn through the entire tree grouping. When the tree felling operation is performed on the tree grouping 302, then a fire may be halted at the edge of the gap because the fire cannot move to the trees on the opposite end of the gap.

FIG. 4 illustrates a first phase of an exemplary tree felling operation. The first heavy equipment 106 cuts the first tree felling track 402 through the tree grouping. Depending on the landscape of the tree grouping, the first tree felling track 402 might not be a straight line and may traverse changes in elevation. For purposes of illustrate, the first tree felling track 402 illustrated in FIG. 4 is shown as a straight line, but it should be appreciated that a tree felling track is typically not a straight line in typical real-world implementations.

The first heavy equipment 106 includes numerous sensors for tracking the operation of cutting the first tree felling track 402. The first heavy equipment 106 may include, for example, a GPS receiver, an accelerometer, a gyro meter, a magnetometer, a winch sensor, and so forth. The first heavy equipment 106 collects sensor data while it traverses the first clear cutting track 402 and determines precise location coordinates for the length of the first tree felling track 402.

The first heavy equipment 106 includes a computing system having one or more processors for executing instructions stored in non-transitory computer readable storage media. The instructions may include receiving location coordinate data from the GPS 110, and may further include receiving timestamped location coordinate data from the GPS 110 for the duration of the time the first heavy equipment 106 is cutting the first tree felling track 402. The instructions may further include receiving sensor data from one or more sensors on the first heavy equipment 106, including for example, accelerometer sensor data, gyro meter sensor data, magnetometer sensor data, winch release sensor data, and so forth. The instructions may further include merging one or more forms of sensor data to generate merged data. The instructions may further include assessing the sensor data and/or the location coordinate data to calculate a precise path of the first tree felling track 402 including GPS location coordinates for the first tree felling track 402. The precise path of the first tree felling track 402 may further include information about elevation changes or tilting of the first heavy equipment 106 for the duration of the tree felling operation. The first heavy equipment 106 stores the path for the first tree felling track 402. The first heavy equipment 106 transmits the path for the first tree felling track 402 to the second heavy equipment 108 by way of long-range radio waves, Bluetooth communication, or some other communication technology.

FIG. 5 illustrates a second phase of the exemplary tree felling operation. The second phase of the tree felling operation includes cutting a second tree felling track 404 that runs parallel to the first tree felling track 402. If the first tree felling track 402 includes turns, curves, or changes in direction, then the second tree felling track 402 will include the same turns, curves, and changes in direction to ensure the first tree felling track 402 and the second tree felling track 404 are parallel. The second tree felling track 404 is located a set distance away from the first tree felling track 402 depending on the end-goals of the tree felling operation. In an example implementation, the first tree felling track 402 and the second tree felling track 404 are between 100 feet to 500 feet away from one another. It should be appreciated that the distance between the first tree felling track 402 and the second tree felling track 404 is implementation-specific and that any suitable distance falls within the disclosures herein.

It should be appreciated that the second phase of the tree felling operation may be performed by the same heavy equipment that executed the first phase of the tree felling operation. When the first phase and the second phase are performed by the same heavy equipment, then the path of the first tree felling track 402 may be stored locally at the same heavy equipment and then referred to when cutting the path of the second tree felling track 404.

The second phase of the tree felling operation is performed by a different heavy equipment machine when compared with the first phase of the tree felling operation. In such an embodiment, the first heavy equipment 106 cuts the first tree felling track 402 and determines the path of the first tree felling track based on sensor data generated when the first heavy equipment 106 cut the first tree felling track 402. The path of the first tree felling track 402 is an electronic file (may be referred to herein as the first tree felling track file) including precise location coordinates for the first tree felling track 402 along with additional valuable sensor data, such as an indication of changes in elevation or tilting experienced by the first heavy equipment 106. The first heavy equipment 106 sends the path of the first tree felling track to the second heavy equipment 108.

The second heavy equipment 108 receives the path of the first tree felling track from the first heavy equipment 106 by way of a communication 112. The second heavy equipment 108 then cuts the second tree felling track 404 parallel to the first tree felling track 402. A user may manually input a desired distance between the first tree felling track 402 and the second tree felling track 404 or the desired distance may be calculated based on environmental data, saved operational files, and so forth. The second heavy equipment 108 then cuts the second tree felling track 404 to be parallel to the first tree felling track 402 with the help of the heavy equipment syncing platform 104. The second heavy equipment 108 is automated to execute cutting the second tree felling track 404 without human intervention and with the assistance of the heavy equipment syncing platform 104. In an embodiment, an operation of the second heavy equipment 108 cuts the second tree felling track 404 with the assistance of the heavy equipment syncing platform 104.

The heavy equipment syncing platform 104 provides directional information to a controller for the second heavy equipment 108 such that the second heavy equipment 108 can automatically cut the second tree felling track 404 without human intervention. The heavy equipment syncing platform 104 provides messages, notifications, and information on a dashboard to an operator of the second heavy equipment 108 such that the operator can control the second heavy equipment 108 and cut the second tree felling track 404 parallel to the first tree felling track 402.

While the second heavy equipment 108 is cutting the second tree felling track 404 (either automatically or with a human operator), the heavy equipment syncing platform 104 provides detailed instructions on how to cut the second tree felling track 404 to be parallel with the first tree felling track 402. For example, the heavy equipment syncing platform 104 may provide a code-based instruction, a text-based readable instructions, and/or a verbalized instruction that the second heavy equipment 108 needs to turn a number of degrees to the left or the right to remain parallel with the first tree felling track 402. Further for example, the heavy equipment syncing platform 104 may provide warnings about anticipated changes in elevation, tilts to the landscape, hard turns, and so forth. The heavy equipment syncing platform 104 provides necessary information and guidance to the second heavy equipment 108 (either a controller of the equipment itself or a human operator) such that the second tree felling track 404 remains parallel to the first tree felling track 402.

The communications 112 between the heavy equipment 106, 108 devices is ongoing throughout the tree felling operation. In an implementation, after one or more of the first tree felling track 402 and the second tree felling track 404 are executed, the heavy equipment 106, 108 provides data to other heavy equipment devices that may then begin cutting the interior space between the first tree felling track 402 and the second tree felling track 404. The total space that will be cut is illustrated in FIG. 8 as the space cleared by the tree felling operation 802.

FIGS. 6-7 illustrates a third phase of the exemplary tree felling operation. At the start of the third phase, each of the first tree felling track 402 and the second tree felling track 404 has been successfully cut down. The trees within these tracks additionally may be removed from the site. The first heavy equipment 106 and the second heavy equipment 108 may return to the "starting line" of the respective tracks or may begin at the "finish line" of the respective tracks and traverse the tracks backwards. During the third phase, the first heavy equipment 106 and the second heavy equipment 108 are connected to one another with a cable, chain, or other heavy-duty rope-like connection (may be referred to herein as a "cable" to generically refer to any of the above). In the middle of the cable is a fulcrum roller 602 that may be circular or elliptical in shape. The fulcrum roller 602 may comprise a cylindrical midsection and tapered ends on either side of the cylindrical midsection. The fulcrum roller 602 may be large and very heavy such that the fulcrum roller 602 can roll along the ground and knock over and/or crush trees within its path. In an embodiment, each heavy equipment 106, 108 has a separate cable extending from a winch that is attached to the fulcrum roller 602.

The fulcrum roller 602 serves as a weight to assist in executing the tree felling operation. A first cable is attached to the first heavy equipment 106 and a first side of the fulcrum roller 602, and a second cable is attached to the second heavy equipment 108 and a second side of the fulcrum roller 602. The fulcrum roller 602 serves as a midpoint (or near-midpoint) between the first heavy equipment 106 and second heavy equipment 108. The fulcrum roller 602 includes a means for connecting to the first cable and the second cable and may additionally include means for connecting to additional cables as deemed necessary. The means for connecting to the first cable and the second cable may include a hook, loop, latch, or other means for providing a secure and releasable attachment to the cable. The means for connecting to the cable is a certain distance above the ground when the fulcrum roller 602 is resting on the ground. This distance may be optimized for executing a tree felling operation because this distance will also determine the height of the first cable and the second cable above the ground. In an implementation, the fulcrum roller 602 is optimized such that the cable is suspended three feet above the ground, four feet above the ground, five feet above the ground, or some other distance as deemed necessary. The first cable and the second cable uproot the trees during the tree felling operation by pulling on the trunks of the trees. Some trees will be uprooted more efficiently when the cable is at a certain distance above ground. Additionally, the location of the cable connection on the fulcrum roller 602 may be adjustable and optimized for the certain species of tree that will be uprooted during the tree felling operation.

The fulcrum roller 602 may be hollow such that a mass of the fulcrum roller 602 can be adjusted by adding water, sand, or some other weight into the interior cavity of the fulcrum roller 602. The added weight may be removed after executing the tree felling operation to maneuver and transport the fulcrum roller 602 after use more easily. The weight of the fulcrum roller 602 may be optimized such that the fulcrum roller 602 does not slide or roll up the trunks of trees during execution of the tree felling operation. In some implementations, it is desirable that the fulcrum roller 602 has a sufficient mass to be weighed down and remain on the ground during execution of the tree felling operation.

In an embodiment the fulcrum roller 602 is not attached to the cable but is instead free such that it can roll on its own. In such an embodiment, the cable may be used to pull or drag the fulcrum roller 602 in the desired direction. Specifically, in this embodiment, the fulcrum roller 602 may pose a serious danger to the operators of the heavy equipment 106, 108 if the trajectory or speed of the fulcrum roller 602 are not continually controlled. For example, if the heavy equipment 106, 108 and the fulcrum roller 602 are travelling downhill, the fulcrum roller 602 may gather speed and begin to roll in undesirable directions. For this reason, it can be imperative that the trajectory and speed of the fulcrum roller are controlled by the first heavy equipment 106 and the second heavy equipment 108. This can most effectively be accomplished by ensuring the fulcrum roller 602 is located at the midpoint between the heavy equipment 106, 108, ensuring the cable between the heavy equipment 106, 108 is taught, and ensuring the heavy equipment 106, 108 are in line with one another such that one heavy equipment is not in front of or lagging behind the other. Each of these considerations is accomplished by way of the communications 112 between the first heavy equipment 106 and the second heavy equipment 108, along with the information provided by the heavy equipment syncing platform 104.

The size of the fulcrum roller 602 is specialized for executing a tree felling operation. The fulcrum roller 602 includes a first hook on one side for connecting to a first cable attached to the first heavy equipment 106. The fulcrum roller 602 additionally includes a second hook on the opposite side for connecting to second cable attached to the second heavy equipment 108. The first hook and the second hook are located at a vertical midpoint of the fulcrum roller 602 when the fulcrum roller 602 is located on the side of its cylindrical midsection. The height from the ground to the vertical midpoint is specialized for pulling over trees during a tree felling operation. The cables attached to the fulcrum roller and the heavy equipment is responsible for pulling on the trees and uprooting the trees during the tree felling operation.

During the third phase, the first heavy equipment 106 and the second heavy equipment 108 are continually in communication with one another by way of some form of communication 112. The heavy equipment 106, 108 communicate real-time location coordinates and sensor data to one another continually throughout execution of the third phase. This can be especially important when there is a fulcrum roller 602 attached to the cable. The fulcrum roller may be extremely heavy and large such that it poses a significant danger to the operators of the heavy equipment 106, 108 and the heavy equipment itself if the trajectory of the fulcrum roller 602 is not properly controlled. For this reason, it is important to control the location and speed of the fulcrum roller 602 throughout execution of the third phase. This may be most effectively accomplished by ensuring the fulcrum roller 602 remains in the middle point between the first heavy equipment 106 and the second heavy equipment 108 and ensuring that the first heavy equipment 106 and the second heavy equipment 108 are lined up such that one is not in front of or lagging behind the other.

During the third phase, the first heavy equipment 106 and the second heavy equipment 108 continually communicate 112 real-time location coordinates and sensor data to one another. The communications 112 between the heavy equipment 106, 108 may occur five times per second in one exemplary embodiment. Each of the heavy equipment 106, 108 may include a system including one or more processors for analyzing the location coordinates and sensor data and presenting this information to an operator by way of the heavy equipment syncing platform 104. Additionally, the information presented in the heavy equipment syncing platform 104 may be received from the heavy equipment syncing server 102 by way of a cellular network connection or a satellite communication connection. In an embodiment, each of the heavy equipment 106, 108 includes a screen for displaying the heavy equipment syncing platform 104 and providing operational messages to an operator of the heavy equipment 106, 108.

The heavy equipment 106, 108 each include one or more on-board processors for receiving communications 112 from the other heavy equipment and receive sensor data from the instant heavy equipment 106, 108. The one or more on-board processors analyze the sensor data captured by its own sensors and the sensor data captured by the other heavy equipment 106, 108. Based on this analysis, the on-board processors determine whether the instant heavy equipment 106, 108 should turn, slow down, speed up, remain on the present course, or change course to ensure that the two heavy equipment 106, 108 are in line with one another, that the slack of the cable is sufficiently taught, and that the fulcrum roller 602 remains at the midpoint between the heavy equipment 106, 108. The onboard processors may generate a message to be displayed or verbalized to an operator of the heavy equipment 106, 108 and/or electronically transmitted to an electronic controller, driver assistance system, or automated driving system of the heavy equipment 106, 108. The message may indicate for example, that the two heavy equipment 106, 108 are no longer in-line and that the instant heavy equipment should slow down or speed up. The message may indicate that the slack on the cable is not sufficiently taught or is excessively taught, and that the winch should be wound to pull in more cable or release more cable. The message may indicate, for example, that the heavy equipment 106, 108 should make a turn a certain number of degrees to the left or the right. The message may indicate, for example, that the heavy equipment 106, 108 are in line with one another and that the operation is proceeding as planned. Such a message may indicate that no changes in speed, direction, cable slack, or other parameters need to be adjusted at the present time.

The instructions for changing a parameter or maintain the current course may be received from the heavy equipment syncing server by way of a cellular network connection or a satellite communication connection. These instructions might be provided in real time based on output from a neural network trained to analyze satellite imagery of forests and/or the sensor data generated by the heavy equipment 106, 108. These instructions might be manually input be a user interacting with the heavy equipment syncing platform 104 in communication with the heavy equipment syncing server 102. For example, a forest fire manager or wildlife service contractor may be providing instructions via the heavy equipment syncing platform 104 indicating that the heavy equipment 106, 108 should change course, alter the original tree felling plan, engage in a new tree felling plan, continue the present course, evacuate the area, and so forth. In an embodiment, an emergency evacuation message is transmitted to the heavy equipment 106, 108, and the emergency evacuation message is transmitted from the heavy equipment syncing server 102.

FIG. 7 illustrates a continuation of the third phase of the exemplary tree felling operation that is illustrated in FIG. 6. In FIG. 7, the heavy equipment 106, 108 are travelling along the first tree felling track 402 and the second tree felling track 404 in line with one another while pulling the fulcrum roller 602 along the area located between the first tree felling track 402 and the second tree felling track 404. The cable and the fulcrum roller 602 may be configured to break, pull, and/or drag the trees located in the space between the first tree felling track 402 and the second tree felling track 404. At the end of the third phase, the heavy equipment 106, 108 will have traversed the entire tree felling tracks and cleared the space located between the tree felling tracks.

FIG. 8 illustrates a space that has been successfully cleared. The dotted line illustrates the space 802 created by way of the tree felling operation. The space 802 includes the first clear cutting track 402, the second tree felling track 404, and the space between the first and second tree felling tracks 402, 404. This space may serve to prevent the spread of forest fires. For example, if a fire is burning at the upper portion of the trees, the fire might not successfully transfer to the lower portion of trees because the space 802 is sufficiently large to prevent sparks from travelling to the lower portion of trees (and vice versa).

Figure 9:
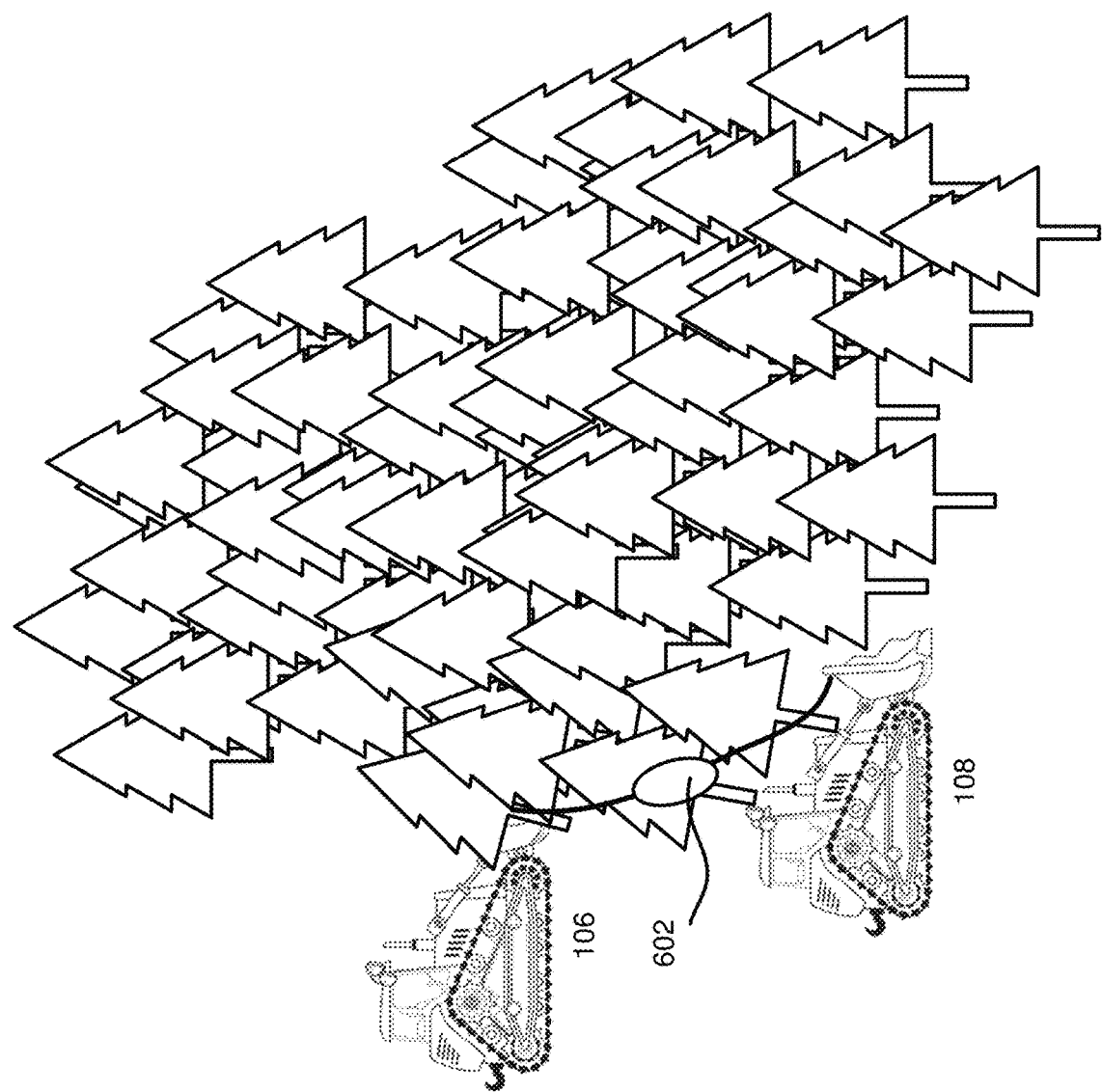
FIG. 9 illustrates an exemplary execution of a tree felling operation.

FIG. 9 illustrates an alternative tree felling operation. In the alternative tree felling operation, the first heavy equipment 106 and the second heavy equipment 108 are connected to one another by way of one or more cables and the fulcrum roller 602. In this alternative operation, the heavy equipment 106, 108 pull the fulcrum roller 602 through the tree grouping without first cutting a tree felling track. Again, in this implementation, the heavy equipment 106, 108 may communicate 112 with one another in real-time to ensure the cable has sufficient slack, the heavy equipment 106, 108 are traversing the correct path, and the fulcrum roller 602 is safely located between the heavy equipment 106, 108. Notably, while performing a tree felling operation, the operators of the heavy equipment 106, 108 likely will not be able to see one another, and therefore it is imperative that the operators can receive guidance and communications from the heavy equipment syncing platform 104 to ensure the safety of the operators and the equipment 106, 108 itself.

FIG. 10 is a schematic diagram of a system 1000 for measuring distances between heavy equipment based at least in part on cable-release measurements captured by a winch monitor. The system 1000 includes the first heavy equipment 106 and the second heavy equipment 108. The heavy equipment 106, 108 may include a dozer configured for tree felling as described herein. The heavy equipment 106, 108 each include a winch 1010 and a winch monitor 1012. A first cable 1014 is secured to the winch 1010 of the first heavy equipment 106 and to the fulcrum roller 602. A second cable 1016 is secured to the winch 1010 of the second heavy equipment 108 and to an opposite side of the fulcrum roller 602. The first and second heavy equipment 106, 108 and thereby secured to one another by way of the cables 1014, 1016 and the fulcrum roller 602. The first and second heavy equipment 106, 108 communicate 112 with each other as discussed herein.

The winch 1010 is a mechanical device used to pull in (wind up) or let out (wind out), or otherwise adjust the length and tension of the cable 1014, 1016. The winch 1010 may include a drum attached to a crank. The crank may be operated with a motor that may be electronically controlled by a system installed in the heavy equipment 106, 108 and/or may be directly controlled by a means for directly actuating the motor, or with a hand crank. The winch 1010 may include a gear assembly that may be powered by electric, hydraulic, pneumatic, or internal combustion drives. The winch 1010 may include a solenoid brake, mechanical brake, and/or rachet and pawl to prevent the winch 1010 from unwinding unless the pawl is ratcheted. The cable 1014, 1016 may be wound up and stored within the winch 1010.

The winch monitor 1012 measures and tracks the release of the cable 1014, 1016 from the winch 1010. The winch monitor 1012 determines what length of cable is extended from the winch 1010, and thereby determines a distance from the heavy equipment 106, 108 to the fulcrum roller 602. The winch monitor 1012 measures the tension on the cable 1014, 1016 and can provide alerts when the tension on the cable 1014, 1016 falls below a certain threshold.

The winch monitor 1012 may include a microprocessor-controlled load-measuring device. The winch monitor 1012 continuously monitors the load on the cable 1014, 1016 as well as the length of the cable 1014, 1016. The winch monitor 1012 may additionally check for minimum and maximum load and length on the cable 1014, 1016. When the load and/or length on the cable 1014, 1016 exceeds or falls below certain thresholds, the winch monitor 1012 may send an alert to the onboard system for the heavy equipment 106, 108 and/or may provide an audible or visual alert. The winch monitor 1012 may provide intermittent visual and audible warnings when the load and/or length on the cable 1014, 1016 comes within a defined threshold from its minimum and maximum limits. The winch monitor 1012 may monitor sensors for malfunction and display an error code when a fault has been detected.

The winch monitor 1012 may communicate with the heavy equipment syncing server 102 directly and/or communicate with an onboard processing system on the heavy equipment 106, 108 that may then communicate with the heavy equipment syncing server 102 to report data from the winch monitor 1012. The winch monitor 1012 may be hardwired to the onboard processing system for the heavy equipment 106, 108 to provide data on the load and length of the cable 1014, 1016. The winch monitor 1012 may be equipped to communicate by way of Bluetooth®, including Bluetooth® Low Energy in Long Range Mode. The winch monitor 1012 may be equipped to communicate on a 2.4 Ghz band to transmit information to the heavy equipment 106, 108. The winch monitors 1012 on separate heavy equipment 106, 108 devices may be configured to communicate directly with one another.

The heavy equipment 106, 108 and the winch 1010 may be configured to release and wind up the cable 1014, 1016 such that the extended length of the first cable 1014 and the second cable 1016 remain the same, or nearly the same, during execution of a tree felling operation. The first and second heavy equipment 106, 108 communicate with one another to determine the necessary length of the first cable 1014 and the second cable 1016 throughout execution of the tree felling operation. The extended lengths of the cables 1014, 1016 may be based on numerous factors, including, for example, landscape topography, elevation difference between the first heavy equipment 106 and the second heavy equipment 108, the pathway for executing the tree felling operation, and so forth.

Figure 11:
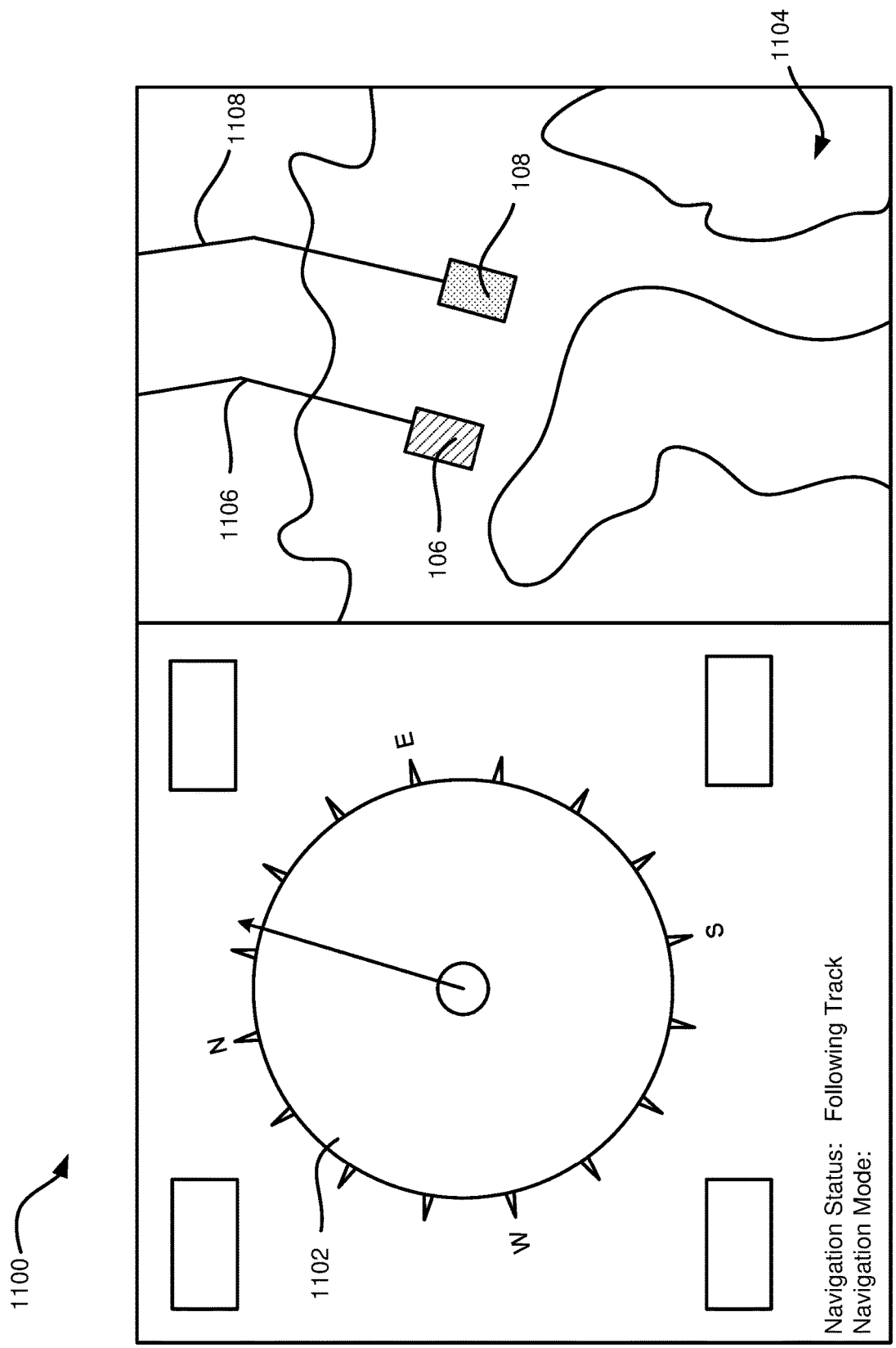
FIG. 11 is a screenshot of an exemplary user interface for illustrating instructions for executing a tree felling operation.

FIG. 11 illustrates an exemplary screenshot of a user interface 1100 of the heavy equipment syncing platform 104. This user interface 1100 may specifically be accessible on a screen located within the heavy equipment 106, 108 to provide real-time instructions, sensor data, and guidance to an operator of the heavy equipment 106, 108. The user interface 1100 may additionally be accessed by way of a computer application, a web browser, a site dedicated to the heavy equipment syncing platform 104, and so forth. The exemplary user interface 1100 illustrated in FIG. 11 includes a digital compass 1102 indicating the curtain direction of the heavy equipment 106, 108. The user interface 1100 additionally depicts the topography 1104 of a location, the locations of the heavy equipment 106, 108, and the pathways 1106, 1108 of the heavy equipment.

The user interface 1100 may indicate the locations, pathways, and topography applicable to the heavy equipment 106, 108 in real-time during a tree felling operation. Additionally, the user interface 1100 may illustrate data and pathways from historical tree felling operations that have been fully executed, partially executed, or planned but not executed. The user interface 1100 illustrates future pathways for tree felling operations that have not yet been executed.

The user interface 1100 may illustrate the current location of the heavy equipment 106, 108 and the future pathways 1106, 1108 of the heavy equipment 106, 108 in real-time during execution of a tree felling operation. The user interface 1100 illustrates the topography 1104 of the location, which may include color satellite imagery depicting where vegetation is located, differences in elevation, water sources, and so forth. The user interface 1100 alerts a heavy equipment 106, 108 driver when the driver has deviated from the course and/or the corresponding driver in the other heavy equipment as deviated from their course. The user interface 1100 provides updated illustrations of the tree felling operation pathway based on updated information regarding the current positions of the heavy equipment, the changes in elevation in the topology, the vegetation to be uprooted, and so forth.

Figure 12A:
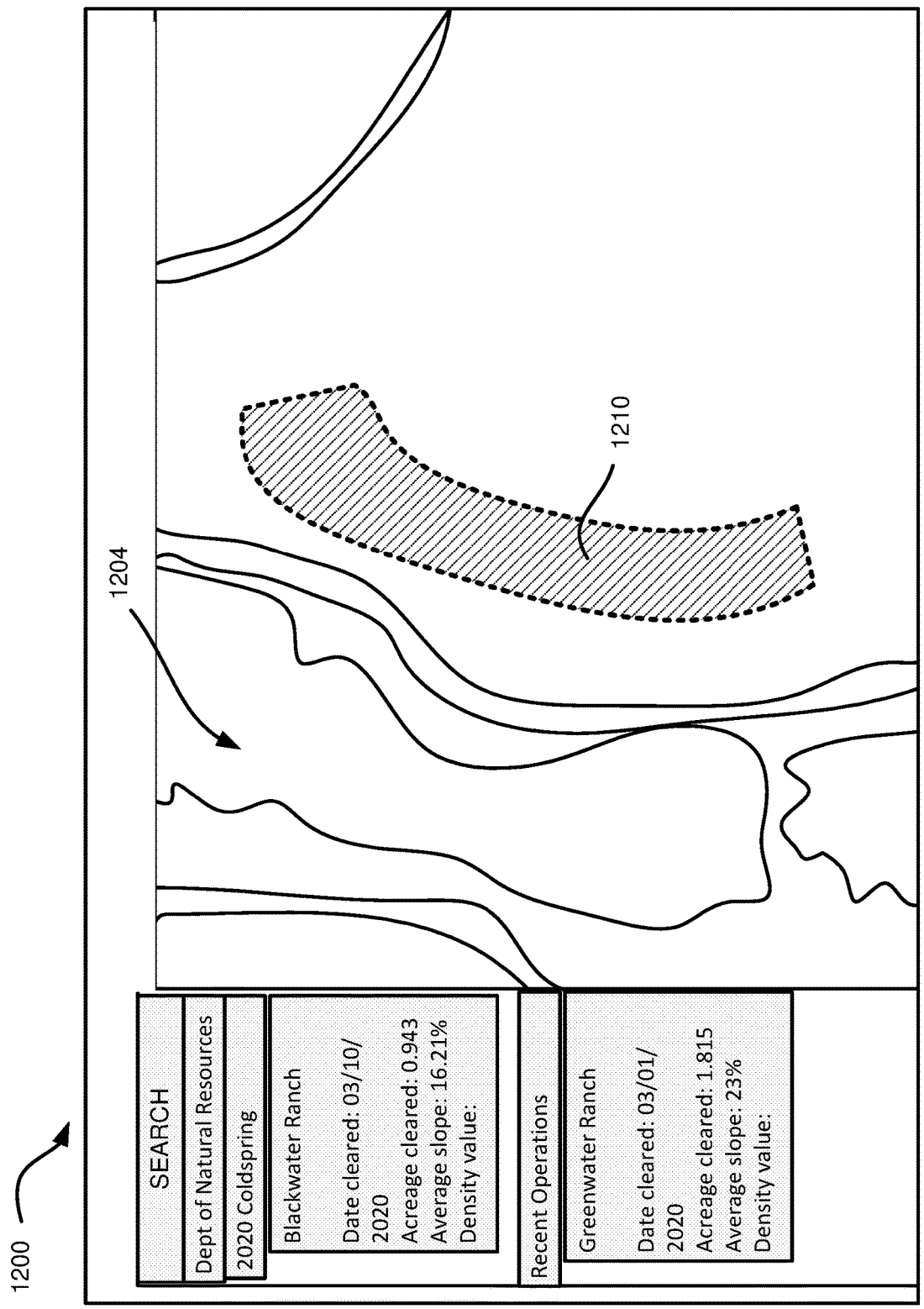
FIG. 12A is a screenshot of an exemplary user interface for illustrating a tree felling area for executing a tree felling operation.
Figure 12B:
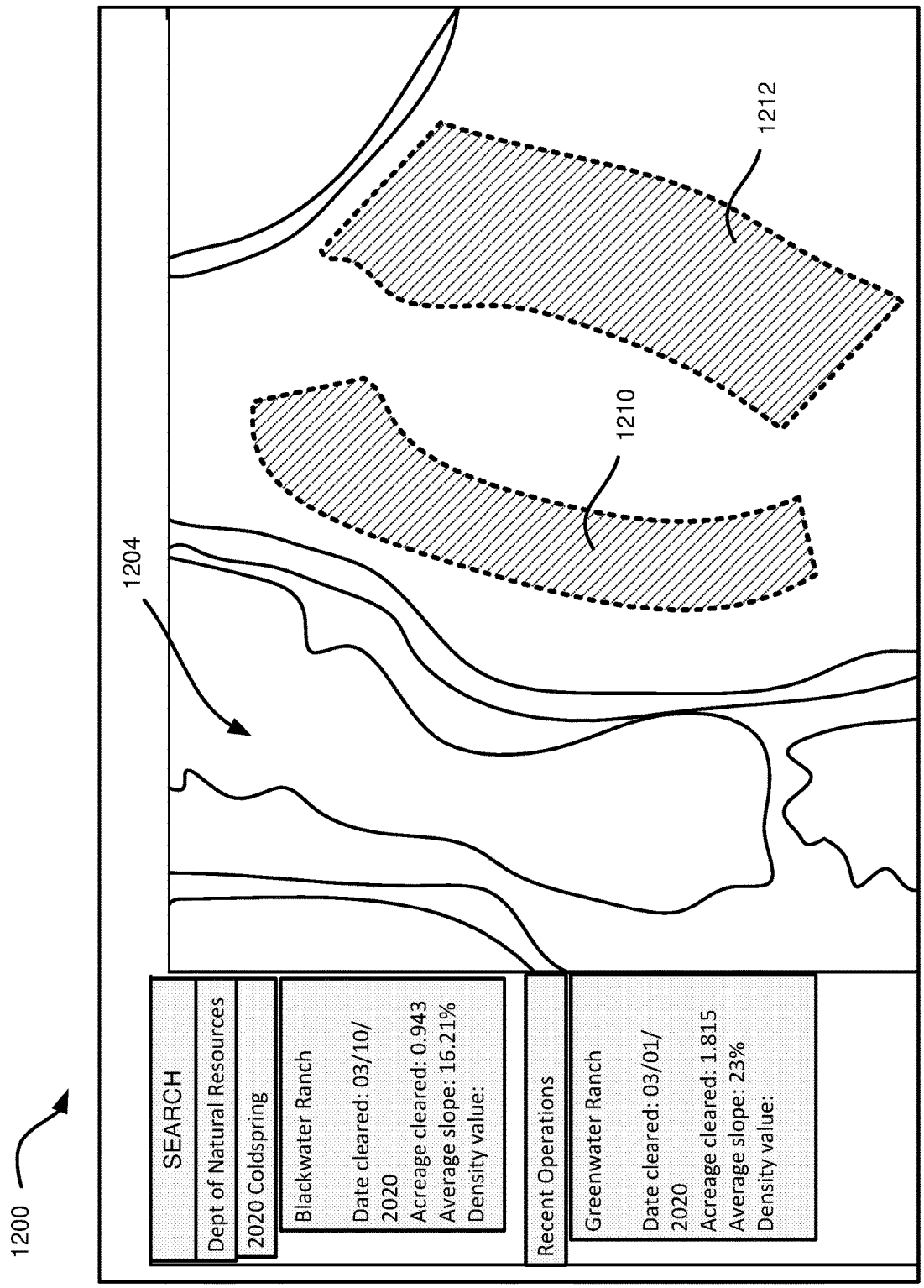
FIG. 12B is a screenshot of an exemplary user interface for illustrating a tree felling area for executing a tree felling operation.

FIGS. 12A-12B illustrate screenshots of exemplary user interfaces 1200 of the heavy equipment syncing platform 104. The user interface 1200 may be accessible via a web browser, application, monitor located within the heavy equipment 106, 108, and so forth. The user interface 1200 is processed by the heavy equipment syncing server 102.

The user interface 1200 illustrated in FIG. 12A provides functionality for a user to select a tree felling area 1210. The tree felling area 1210 is represented by the shaded area wherein trees and other vegetation may be uprooted and removed by a tree felling operation. The tree felling area 1210 may include a colored or shaded overlay on top of a topography 1204 image or map of an area. The topography 1204 may include satellite imagery of the region and/or a topographical map. The selected tree felling area 1210 may be transmitted to onboard processors of heavy equipment 106, 108 to provide precise instructions, including precise geographical coordinates, of where the heavy equipment 106, 108 should perform the tree felling operation.

The user interface 1200 illustrated in FIG. 12B provides functionality for a user to select a region within the world and to view satellite imagery of that region. The user may additionally define a geographical area for performing a tree felling operation and/or may view satellite imagery of a region to determine whether a tree felling operation should be performed within the region. In the user interface 1200 illustrated in FIG. 12B, the system illustrates two tree felling regions, include a first tree felling area 1210 and a second tree felling area 1212.

The user interface 1200 provides functionality for a user to define tree felling areas. Based on the user's selections, the heavy equipment server 102 may determine precise geographical coordinates for the tree felling areas 1210, 1212 based on the location of the shaded regions in relation to the satellite imagery, and the geographical coordinates of the satellite imagery. Additionally, the heavy equipment server 102 may provide this information to heavy equipment 106, 108 along with instructions for executing the tree felling operation. The heavy equipment 106, 108 receives the precise geographical coordinates for the desired tree felling area and then onboard processors for the heavy equipment 106, 108 calculate method steps and directions for executing the tree felling operation. The onboard user interface of the heavy equipment syncing platform 104 indicates to an operator of the heavy equipment 106, 108 where the desired tree felling operation will take place, and then the operator can execute the tree felling operation according to those indications. The onboard heavy equipment syncing platform 104 provides notifications to the operator when the operator has drifted from the desired tree felling area.

The heavy equipment syncing server 102 includes a neural network and/or communicates with a neural network configured to define instructions for a tree felling operation based on a selected tree felling area 1210, 1212. The neural network executes an artificial intelligence/machine learning algorithm to determine the most efficient path to cut lines within the perimeter of the tree felling area 1210, 1212. The neural network is trained on a dataset comprising topographical information, sensor data from the heavy equipment 106, 108, the capabilities of the heavy equipment 106, 108, past successful tree felling operations, and past unsuccessful tree felling operations. The neural network may be configured to generate instructions for a tree felling operation that are specific to a certain make or model of a heavy equipment device 106, 108 such as a dozer. The instructions may include human readable instructions and may additionally include computer-based instructions to be supplied directly to the onboard processor(s) of the heavy equipment 106, 108. In an embodiment, the heavy equipment 106, 108 automatically execute the instructions based on current sensor data, including geographical coordinates, readings from the winch monitor 1012, readings for radar sensors such as LIDAR (Light Detection and Ranging) sensors, image sensors, and so forth. The neural network receives as input one or more of: the topographical details of the location where the tree felling operation will be performed, the coordinates of the perimeter of the tree felling area 1210, 1212, satellite imagery of the region where the tree felling operation will be performed, the makes and models of the heavy equipment 106, 108, the capabilities of the heavy equipment 106, 108, weather conditions, elevation gains and losses throughout the tree felling area 1210, 1212 and the surrounding region, the length and/or load capability of the cables attached to the heavy equipment, the size of the fulcrum roller, the size of the trees and other vegetation to be removed, the species of the trees and other vegetation to be removed, and the ground conditions indicating whether the ground is dry, rocky, wet, muddy, and so forth.

The neural network is trained to calculate a most efficient pathway for executing a tree felling operation. The most efficient pathway is a pathway with the lowest cost based on one or more of: a distance travelled by the heavy equipment, a number of heavy equipment machinery needed to execute the operation, an estimated time duration for executing the operation, an estimated amount of energy consumed during execution of the operation, an estimated amount of fuel required for execution of the operation, an estimated number of personnel for executing the operation, and an environmental impact of the operation.

The heavy equipment syncing server 102 provides the recommendation of the neural network to a user when viewing the established perimeter cut. The user can override or adjust the recommended perimeter cuts to adjust for unusual topographical challenges. This allows multiple heavy equipment devices to quickly work path cut lines simultaneously without needed to rely on another heavy equipment to make initial cuts.

Figure 13:
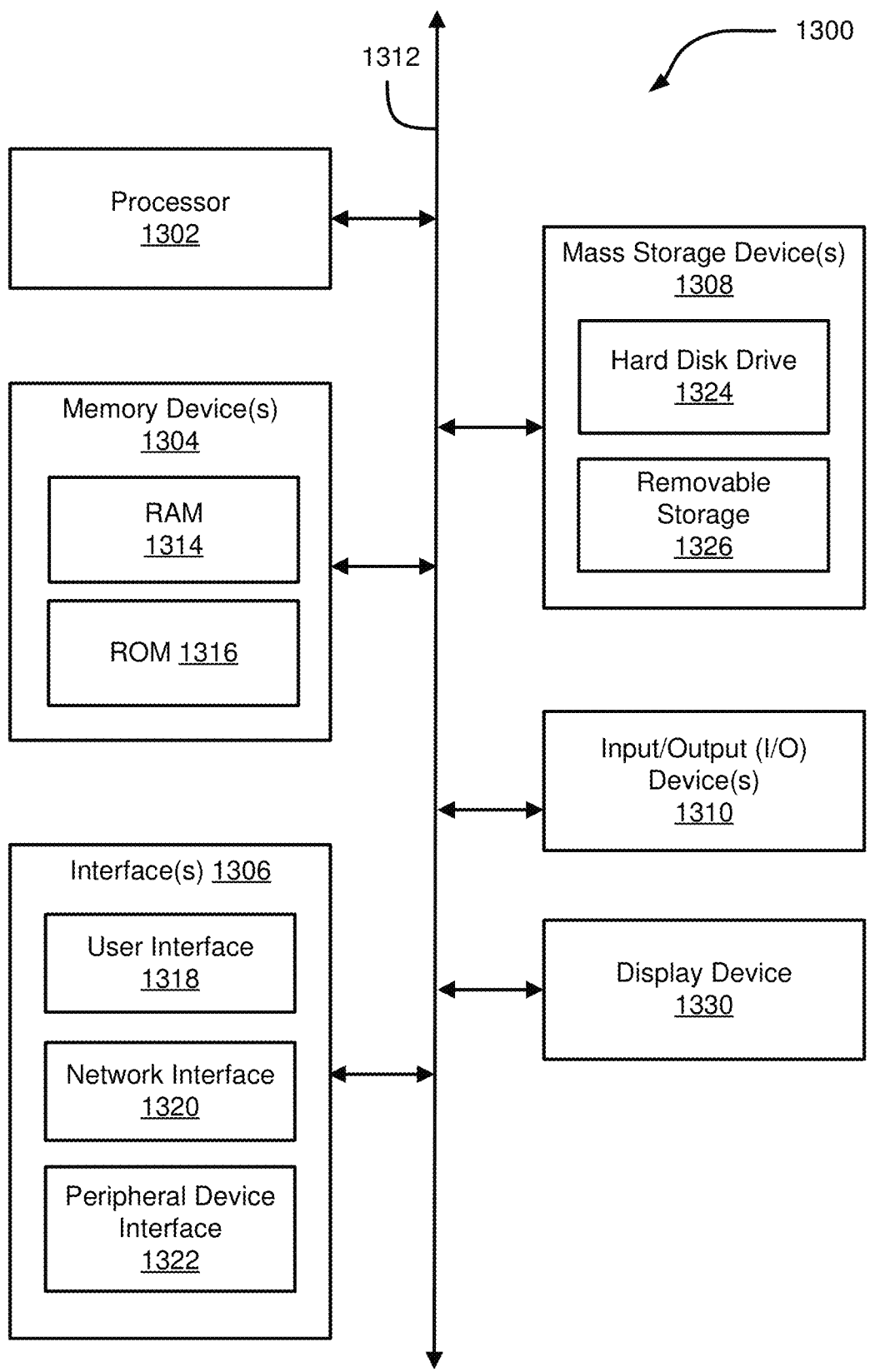
FIG. 13 is a schematic block diagram of an example computing system according to an example embodiment of the systems and methods described herein.

Referring now to FIG. 13, a block diagram of an example computing device 1300 is illustrated. Computing device 1300 may be used to perform various procedures, such as those discussed herein. Computing device 1300 can perform various monitoring functions as discussed herein, and can execute one or more application programs, such as the application programs or functionality described herein. Computing device 1300 can be any of a wide variety of computing devices, such as a desktop computer, in-dash computer, vehicle control system, a notebook computer, a server computer, a handheld computer, tablet computer and the like.

Computing device 1300 includes one or more processor(s) 1302, one or more memory device(s) 1304, one or more interface(s) 1306, one or more mass storage device(s) 1308, one or more Input/output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device 1308 is a hard disk drive 1324. Various drives may also be included in mass storage device(s) 1308 to enable reading from and/or writing to the various computer readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors, touchscreen devices, or other display devices, speakers, printers, network interface cards, modems, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 may include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, or any suitable user interface now known to those of ordinary skill in the field, or later discovered), keyboards, and the like.

Bus 1312 allows processor(s) 1302, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1800 and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein. The terms "module" or "component" are intended to convey independent in how the modules, components, or their functionality or hardware may be implemented in different embodiments.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components or modules, which are terms used to more particularly emphasize their implementation independence. For example, a component or module may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

EXAMPLES

The following examples pertain to further embodiments.

Example 1 is a method. The method includes receiving first sensor data from a first heavy equipment during operation of the first heavy equipment. The method includes storing the first sensor data. The method includes providing the first sensor data to a second heavy equipment. The method includes receiving second sensor data from the second heavy equipment when the first heavy equipment and the second heavy equipment are in operation in tandem.

Example 2 is a method as in Example 1. The method includes comparing the first sensor data and the second sensor data when the first heavy equipment and the second heavy equipment are in operation in tandem.

Example 3 is a method as in any of Examples 1-2, wherein each of the first heavy equipment and the second heavy equipment is a dozer configured for tree felling operations.

Example 4 is a method as in any of Examples 1-3, further comprising determining whether the first heavy equipment and the second heavy equipment are in line such that the first heavy equipment is not ahead of or lagging behind the second heavy equipment during the operation in tandem.

Example 5 is a method as in any of Examples 1-4, further comprising, in response to determining the first heavy equipment and the second heavy equipment are not in line, calculating an operation instruction to be executed by the first heavy equipment such that the first heavy equipment and the second heavy equipment will be in line after execution of the operation instruction.

Example 6 is a method as in any of Examples 1-6, further comprising providing the first sensor data to the second heavy equipment and receiving the second sensor data from the second heavy equipment in real-time during the operation in tandem.

Example 7 is a method as in any of Examples 1-6, wherein the first sensor data and the second sensor data comprise one or more of: geographical location data, accelerometer sensor data, gyro meter sensor data, magnetometer sensor data, or winch monitor sensor data.

Example 8 is a method as in any of Examples 1-7, further comprising determining whether a first cable attached to a first winch of the first heavy equipment is connected to a second cable of the second heavy equipment.

Example 9 is a method as in any of Examples 1-8, further comprising receiving sensor data from a first winch monitor of the first heavy equipment indicating a length of a first cable that has been released from the first winch.

Example 10 is a method as in any of Examples 1-9, further comprising determining whether the length of the first cable that has been released from the first winch is equal to a length of a second cable that has been released from a second winch of the second heavy equipment based on sensor data received from the second heavy equipment.

Example 11 is a method. The method includes identifying a tree felling area to be cut in a tree felling operation. The method includes determining instructions for executing the tree felling operation with two or more heavy equipment machinery. The method includes receiving first sensor data from a first heavy equipment during execution of the tree felling operation. The method includes providing the first sensor data to a second heavy equipment during execution of the tree felling operation.

Example 12 is a method as in Example 11, wherein determining the instructions for executing the tree felling operation comprises: receiving a geographical location for the tree felling area; determining a topography of the geographical location comprising one or more of: an elevation of the tree felling area, a change in elevation across the tree felling area, density of vegetation growing in the tree felling area, and species of vegetation growing in the tree felling area; providing the geographical location and the topography of the geographical location to a neural network trained to determine a most efficient plan for executing the tree felling operation.

Example 13 is a method as in any of Examples 11-12, wherein the neural network is trained on a dataset comprising historical tree felling operations, and wherein the neural network calculates the most efficient pathway for executing the tree felling operation based on one or more of: the topography of the geographical location, a make and/or model of heavy equipment to be used for the tree felling operation, weather conditions at the tree felling area, ground conditions at the tree felling area, size of the tree felling area, and coordinates of the tree felling area.

Example 14 is a method as in any of Examples 11-13, wherein the most efficient plan comprises a plan with the lowest cost based on one or more of: a distance travelled by the two or more heavy equipment machinery, a number of heavy equipment machinery needed to execute the tree felling operation, an estimated time duration for executing the tree felling operation, an estimated amount of energy consumed during execution of the tree felling operation, an estimated number of personnel for executing the tree felling operation, and an environmental impact of the tree felling operation.

Example 15 is a method as in any of Examples 11-14, wherein determining the instructions for executing the tree felling operation comprises determining one or more of: a first pathway to be traversed by the first heavy equipment; a second pathway to be traversed by the second heavy equipment; a distance between the first heavy equipment and the second heavy equipment; a mass of a fulcrum roller to be connected to each of the first heavy equipment and the second heavy equipment; a length and/or a load on a cable to be attached to the first heavy equipment and the fulcrum roller; or a length and/or a load on a cable to be attached to the second heavy equipment and the fulcrum roller.

Example 16 is a method as in any of Examples 11-15, wherein the first sensor data comprises one or more of: a geographical location of the first heavy equipment, an elevation of the first heavy equipment, a length of a cable attached to the first heavy equipment and a fulcrum roller, or a load on a cable attached to the first heavy equipment and the fulcrum roller.

Example 17 is a method as in any of Examples 11-16, further comprising: receiving second sensor data from the second heavy equipment during execution of the tree felling operation; providing the second sensor data to the first heavy equipment during execution of the tree felling operation; wherein the first heavy equipment communicates with the second heavy equipment by way of one or more of long-range radio signals or long-range wireless communication; and wherein the second sensor data comprises one or more of: a geographical location of the second heavy equipment, an elevation of the second heavy equipment, a length of a cable attached to the second heavy equipment and a fulcrum roller, or a load on a cable attached to the second heavy equipment and the fulcrum roller.

Example 18 is a method as in any of Examples 11-17, further comprising: receiving a first winch reading from a first winch monitor in communication with a winch on the first heavy equipment; and receiving a second winch reading from a second winch monitor in communication with a winch on the second heavy equipment; wherein the first winch reading comprises an indication of a load and/or extended length on a cable extended from the winch on the first heavy equipment to a fulcrum roller; and wherein the second winch reading comprises an indication of a load and/or extended length on a cable extended from the winch on the second heavy equipment to the fulcrum roller.

Example 19 is a method as in any of Examples 11-18, wherein determining the instructions for executing the tree felling operation comprises determining first instructions for execution by the first heavy equipment and second instructions for execution by the second heavy equipment, and wherein the method further comprises: providing the first instructions to an onboard controller of the first heavy equipment for executing one or more driving operations by the first heavy equipment; and providing the second instructions to an onboard controller of the second heavy equipment for executing one or more driving operations by the second heavy equipment.

Example 20 is a method as in any of Examples 11-19, further comprising: receiving second sensor data from the second heavy equipment during execution of the tree felling operation; generating updated instructions in real-time during execution of the tree felling operation based on either of the first sensor data or the second sensor data; and providing the updated instructions to the onboard controller of the second heavy equipment and the onboard controller of the first heavy equipment.

Example 21 is non-transitory computer readable storage media for storing instructions to be executed by one or more processors, wherein the instructions comprise any of the method steps of Examples 1-20.

Example 22 is a system comprising one or more processors configurable to execute instructions stored in non-transitory computer readable storage media, wherein the instructions comprise any of the method steps of Examples 1-20.

Example 23 is a system. The system includes a first heavy equipment comprising a first winch and a second heavy equipment comprising a second winch. The system includes a first cable attached to the first winch and a fulcrum roller and a second cable attached to the second winch and the fulcrum roller. The system is such that the first heavy equipment communicates with the second heavy equipment by way of long-range radio signals.

Example 24 is a system as in Example 23, further comprising: a first winch monitor in communication with the first winch, wherein the first winch monitor senses an extended length and/or a load on the first cable; and a second winch monitor in communication with the second winch, wherein the second winch monitor senses an extended length and/or a load on the second cable.

Example 25 is a system as in any of Examples 23-24, further comprising: a first blade attached to the first heavy equipment, wherein the first blade is configured for uprooting trees during a tree felling operation; and a second blade attached to the second heavy equipment, wherein the second blade is configured for uprooting drees during the tree felling operation.

Example 26 is a system as in any of Examples 23-25, wherein each of the first heavy equipment and the second heavy equipment is a dozer for executing a tree felling operation.

Example 27 is a system as in any of Examples 23-26, wherein the fulcrum roller comprises: a first hook for connecting to the first cable attached to the first winch of the first heavy equipment; and a second hook on an opposite side of the fulcrum roller relative to the first hook for connecting to the second cable attached to the second winch of the second heavy equipment; wherein a height of each of the first hook and the second hook relative to the ground is configured to uprooting trees with the first cable and the second cable during a tree felling operation.

Example 28 is a system as in any of Examples 23-27, further comprising: a first onboard controller integrated in the first heavy equipment, wherein the first onboard controller receives sensor data from one or more sensors of the first heavy equipment; and a second onboard controller integrated in the second heavy equipment, wherein the second onboard controller receives sensor data from one or more sensors of the second heavy equipment; wherein the first onboard controller and the second onboard controller communicate with one another by way of the long-range radio signals.

Example 29 is a system as in any of Examples 23-28, wherein the first onboard controller and the second onboard controller communicate with a syncing server comprising one or more processors for executing instructions stored in non-transitory computer readable storage media, the instructions comprising: identifying a tree felling area to be cut in a tree felling operation; determining instructions for executing the tree felling operation with two or more heavy equipment machinery; receiving first sensor data from the first heavy equipment during execution of the tree felling operation; and receiving second sensor data from the second heavy equipment during execution of the tree felling operation.

Example 30 is a system as in any of Examples 23-29, wherein the instructions are such that determining the instructions for executing the tree felling operation comprises: receiving a geographical location for the tree felling area; determining a topography of the geographical location comprising one or more of: an elevation of the tree felling area, a change in elevation across the tree felling area, density of vegetation growing in the tree felling area, and species of vegetation growing in the tree felling area; providing the geographical location and the topography of the geographical location to a neural network trained to determine a most efficient plan for executing the tree felling operation.

Example 31 is a system as in any of Examples 23-30, wherein the instructions are such that determining the instructions for executing the tree felling operation comprises determining one or more of: a first pathway to be traversed by the first heavy equipment; a second pathway to be traversed by the second heavy equipment; a distance between the first heavy equipment and the second heavy equipment; a mass of the fulcrum roller to be connected to each of the first heavy equipment and the second heavy equipment; a length and/or a load on the first cable; or a length and/or a load on the second cable.

Example 32 is a system as in any of Examples 23-31, wherein the first sensor data comprises one or more of: a geographical location of the first heavy equipment, an elevation of the first heavy equipment, a length of the first cable attached to the first winch, or a load on the first cable attached to the first winch.

Example 33 is a system as in any of Examples 23-32, wherein the instructions further comprise: receiving second sensor data from the second heavy equipment during execution of the tree felling operation; and providing the second sensor data to the first heavy equipment during execution of the tree felling operation; wherein the second sensor data comprises one or more of: a geographical location of the second heavy equipment, an elevation of the second heavy equipment, a length of the second cable attached to the second winch, or a load on the second cable attached to the second winch.

Example 34 is a system as in any of Examples 23-33, further comprising: a Global Positioning System (GPS) sensor on each of the first heavy equipment and the second heavy equipment; a first winch monitor in communication with the first winch for measuring a load and/or an extended length of the first cable; and a second winch monitor in communication with the second winch for measuring a load and/or an extended length of the second cable.

Example 35 is a system as in any of Examples 23-34, further comprising one or more of: an accelerometer sensor on each of the first heavy equipment and the second heavy equipment; or an image sensor on each of the first heavy equipment and the second heavy equipment; wherein each of the first heavy equipment and the second heavy equipment is a dozer configured for uprooting trees in a tree felling operation.

Example 36 is a system as in any of Examples 23-35, further comprising one or more processors for executing instructions for a heavy equipment syncing platform, wherein each of the first heavy equipment and the second heavy equipment comprises an onboard controller in communication with the heavy equipment syncing platform.

Example 37 is a system as in any of Examples 23-36, further comprising: a first display in the first heavy equipment for displaying a user interface; and a second display in the second heavy equipment for displaying the user interface.

Example 38 is a system as in any of Examples 23-37, wherein the user interface is generated by the one or more processors for executing the instructions for the heavy equipment syncing platform, and wherein the user interface comprises one or more of: satellite imagery depicting a geographical region; a compass; an indication of historical and/or current sensor readings by sensors associated with the first heavy equipment and/or the second heavy equipment.

Example 39 is a system as in any of Examples 23-38, wherein the user interface further displays real-time instructions for executing a tree felling operation, wherein the instructions comprise: an indication of a current geographical location of the first heavy equipment; an indication of a current geographical location of the second heavy equipment; a future planned pathway to be traversed by the first heavy equipment; and a future planned pathway to be traversed by the second heavy equipment.

Example 40 is a system as in any of Examples 23-39, wherein the user interface further displays a graphical depiction of a geographical region and a tree felling area to be executed at the geographical region.

Example 41 is a system as in any of Examples 23-40, wherein the graphical depiction of the geographical region comprises satellite imagery of the geographical region, and wherein the user interface displays the tree felling area as a shaded overlay on the satellite imagery for depicting a size and shape of the tree felling area.

Example 42 is a system as in any of Examples 23-41, further comprising: one or more sensors of the first heavy equipment for generating first sensor data; and one or more sensors of the second heavy equipment for generating second sensor data; wherein the first heavy equipment communicates the first sensor data to the second heavy equipment during a tree felling operation; wherein the second heavy equipment communicates the second sensor data to the first heavy equipment during the tree felling operation; wherein the first display in the first heavy equipment provides an indication of the first sensor data and the second sensor data during the tree felling operation; and wherein the second display in the second heavy equipment provides an indication for the first sensor data and the second sensor data during the tree felling operation.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A method comprising: identifying a tree felling area to be cut in a tree felling operation, wherein the tree felling area is defined by: a first tree felling track; a second tree felling track substantially parallel to the first tree felling track; and a middle tree felling region disposed between the first tree felling track and the second tree felling track; determining instructions for executing the tree felling operation with two or more heavy equipment machinery, wherein the instructions comprise: felling trees in the first tree felling track; felling trees in the second tree felling track; and felling trees in the middle tree felling region by simultaneously operating a first heavy equipment and a second heavy equipment; and synchronizing first sensor data to the second heavy equipment during execution of the tree felling operation, wherein the first sensor data is captured by the first heavy equipment; wherein the first sensor data comprises first winch data captured during execution of the tree felling operation, and wherein the first winch data comprises an indication of one or more of a load and an extended length on a first cable extended from the first heavy equipment to a fulcrum roller, and wherein the fulcrum roller is located in between the first heavy equipment and the second heavy equipment.

2. The method of claim 1, wherein determining the instructions for executing the tree felling operation comprises: receiving a geographical location for the tree felling area; determining a topography of the geographical location comprising one or more of: an elevation of the tree felling area, a change in elevation across the tree felling area, density of vegetation growing in the tree felling area, and species of vegetation growing in the tree felling area; and providing the geographical location and the topography of the geographical location to a neural network trained to determine a most efficient plan for executing the tree felling operation.

3. The method of claim 2, wherein the neural network is trained on a dataset comprising historical tree felling operations, and wherein the neural network calculates the most efficient pathway for executing the tree felling operation based on one or more of: the topography of the geographical location, a make and/or model of heavy equipment to be used for the tree felling operation, weather conditions at the tree felling area, ground conditions at the tree felling area, size of the tree felling area, and coordinates of the tree felling area.

4. The method of claim 2, wherein the most efficient plan comprises a plan with a lowest cost, and wherein the lowest cost is determined based on one or more of: a shortest distance travelled by the two or more heavy equipment machinery; a fewest quantity of heavy equipment machinery needed to execute the tree felling operation; a shortest estimated time duration for executing the tree felling operation; a smallest estimated amount of energy consumed during execution of the tree felling operation; a smallest estimated number of personnel for executing the tree felling operation; or a least significant environmental impact of the tree felling operation.

5. The method of claim 1, wherein determining the instructions for executing the tree felling operation comprises determining a location and distance of the first tree felling track to be traversed by the first heavy equipment; a location and distance of the second tree felling track to be traversed by the second heavy equipment; a distance between the first tree felling track and the second tree felling track; a mass of the fulcrum roller, wherein the fulcrum roller is connected to each of the first heavy equipment and the second heavy equipment when felling trees in the middle tree felling region; the length and the load on the first cable extended from the first heavy equipment to the fulcrum roller; and a length and a load on a second cable extended from the second heavy equipment to the fulcrum roller.

6. The method of claim 1, wherein the first sensor data further comprises a geographical location of the first heavy equipment and an elevation of the first heavy equipment.

7. The method of claim 1, further comprising and synchronizing second sensor data to the first heavy equipment, wherein the second sensor data is captured by the second heavy equipment during execution of the tree felling operation; wherein the second sensor data comprises an indication of one or more of a load and an extended length on a second cable extended from the second heavy equipment to the fulcrum roller.

8. The method of claim 1, further comprising: receiving a first winch reading from a first winch monitor in communication with a winch on the first heavy equipment; and receiving a second winch reading from a second winch monitor in communication with a winch on the second heavy equipment; wherein the first winch reading comprises an indication of one or more of the load and the extended length on the first cable, wherein the first cable extends from the winch on the first heavy equipment to the fulcrum roller, and wherein the second winch reading comprises an indication of one or more of a load and an extended length on a second cable, wherein the second cable extends from the winch on the second heavy equipment to the fulcrum roller.

9. The method of claim 1, further comprising: providing computer-readable instructions to an onboard controller of the first heavy equipment for executing one or more driving operations by the first heavy equipment; providing computer-readable instructions to an onboard controller of the second heavy equipment for executing one or more driving operations by the second heavy equipment; and simultaneously communicating with the first heavy equipment and the second heavy equipment when felling trees in the middle tree felling region.

10. The method of claim 9, further comprising: receiving second sensor data from the second heavy equipment during execution of the tree felling operation; generating updated instructions in real-time during execution of the tree felling operation based on either of the first sensor data or the second sensor data; and providing the updated instructions to the onboard controller of the second heavy equipment and the onboard controller of the first heavy equipment.

11. A system comprising one or more processors for executing instructions stored in non-transitory computer readable storage media, the instructions comprising: identifying a tree felling area to be cut in a tree felling operation, wherein the tree felling area is defined by: a first tree felling track; a second tree felling track substantially parallel to the first tree felling track; and a middle tree felling region disposed between the first tree felling track and the second tree felling track; determining instructions for executing the tree felling operation with two or more heavy equipment machinery, wherein the instructions comprise: felling trees in the first tree felling track; felling trees in the second tree felling track; and felling trees in the middle tree felling region by simultaneously operating a first heavy equipment and a second heavy equipment; and synchronizing first sensor data to the second heavy equipment during execution of the tree felling operation, wherein the first sensor data is captured by the first heavy equipment; wherein the first sensor data comprises first winch data captured during execution of the tree felling operation, and wherein the first winch data comprises an indication of one or more of a load and an extended length on a first cable extended from the first heavy equipment to a fulcrum roller, and wherein the fulcrum roller is located in between the first heavy equipment and the second heavy equipment.

12. The system of claim 11, wherein the instructions are such that determining the tree felling instructions for executing the tree felling operation comprises: receiving a geographical location for the tree felling area; determining a topography of the geographical location comprising one or more of: an elevation of the tree felling area, a change in elevation across the tree felling area, density of vegetation growing in the tree felling area, and species of vegetation growing in the tree felling area; and providing the geographical location and the topography of the geographical location to a neural network trained to determine a most efficient plan for executing the tree felling operation.

13. The system of claim 12, wherein the neural network is trained on a dataset comprising historical tree felling operations, and wherein the neural network calculates the most efficient pathway for executing the tree felling operation based on one or more of: the topography of the geographical location, a make and/or model of heavy equipment to be used for the tree felling operation, weather conditions at the tree felling area, ground conditions at the tree felling area, size of the tree felling area, and coordinates of the tree felling area.

14. The system of claim 12, wherein the most efficient plan comprises a plan with a lowest cost, and wherein the lowest cost is determined based on one or more of: a shortest distance travelled by the two or more heavy equipment machinery; a fewest quantity of heavy equipment machinery needed to execute the tree felling operation; a shortest estimated time duration for executing the tree felling operation; a smallest estimated amount of energy consumed during execution of the tree felling operation; a smallest estimated number of personnel for executing the tree felling operation; or a least significant environmental impact of the tree felling operation.

15. The system of claim 11, wherein the instructions are such that determining the tree felling instructions for executing the tree felling operation comprises determining a location and distance of the first tree felling track to be traversed by the first heavy equipment; a location and distance of the second tree felling track to be traversed by the second heavy equipment; a distance between the first tree felling track and the second tree felling track; a mass of the fulcrum roller, wherein the fulcrum roller is connected to each of the first heavy equipment and the second heavy equipment when felling trees in the middle tree felling region; the length and the load on the first cable extended from the first heavy equipment to the fulcrum roller; and a length and a load on a second cable extended from the second heavy equipment to the fulcrum roller.

16. Non-transitory computer readable storage media for storing instructions to be executed by one or more processors, the instructions comprising: identifying a tree felling area to be cut in a tree felling operation, wherein the tree felling area is defined by: a first tree felling track; a second tree felling track substantially parallel to the first tree felling track; and a middle tree felling region disposed between the first tree felling track and the second tree felling track; determining instructions for executing the tree felling operation with two or more heavy equipment machinery, wherein the instructions comprise: felling trees in the first tree felling track; felling trees in the second tree felling track; and felling trees in the middle tree felling region by simultaneously operating a first heavy equipment and a second heavy equipment; and synchronizing first sensor data to the second heavy equipment during execution of the tree felling operation, wherein the first sensor data is captured by the first heavy equipment; wherein the first sensor data comprises first winch data captured during execution of the tree felling operation, and wherein the first winch data comprises an indication of one or more of a load and an extended length on a first cable extended from the first heavy equipment to a fulcrum roller, and wherein the fulcrum roller is located in between the first heavy equipment and the second heavy equipment.

17. The non-transitory computer readable storage media of claim 16, wherein the first sensor data further comprises a geographical location of the first heavy equipment and an elevation of the first heavy equipment.

18. The non-transitory computer readable storage media of claim 16, wherein the instructions further comprise synchronizing second sensor data to the first heavy equipment, wherein the second sensor data is captured by the second heavy equipment during execution of the tree felling operation; wherein the second sensor data comprises an indication of one or more of a load and an extended length on a second cable extended from the second heavy equipment to the fulcrum roller.

19. The non-transitory computer readable storage media of claim 16, wherein the instructions further comprise: receiving a first winch reading from a first winch monitor in communication with a winch on the first heavy equipment; and receiving a second winch reading from a second winch monitor in communication with a winch on the second heavy equipment; wherein the first winch reading comprises an indication of one or more of the load and the extended length on the first cable, wherein the first cable extends from the winch on the first heavy equipment to the fulcrum roller; and wherein the second winch reading comprises an indication of one or more of a load and an extended length on a second cable, wherein the second cable extends from the winch on the second heavy equipment to the fulcrum roller.

20. The non-transitory computer readable storage media of claim 16, wherein the instructions further comprise: providing computer-readable instructions to an onboard controller of the first heavy equipment for executing one or more driving operations by the first heavy equipment; providing computer-readable instructions to an onboard controller of the second heavy equipment for executing one or more driving operations by the second heavy equipment; and simultaneously communicating with the first heavy equipment and the second heavy equipment when felling trees in the middle tree felling region.

\* \* \* \* \*